US006728616B1

(12) United States Patent
Tabe

(10) Patent No.: US 6,728,616 B1
(45) Date of Patent: Apr. 27, 2004

(54) SMART SEATBELT CONTROL SYSTEM

(76) Inventor: Joseph A. Tabe, 525 Thayer Ave., Suite 315, Silver Spring, MD (US) 20910

( * ) Notice: Subject to any disclaimer, the term of this patent is extended or adjusted under 35 U.S.C. 154(b) by 0 days.

(21) Appl. No.: 09/692,098

(22) Filed: Oct. 20, 2000

(51) Int. Cl.[7] .......................... G06F 7/00; G06F 19/00; B60R 22/00
(52) U.S. Cl. ................... 701/45; 280/801.1; 180/273; 180/268; 180/282; 340/667; 296/68.1
(58) Field of Search .................. 701/45, 47; 280/735, 280/732, 734, 807, 806, 808, 801.1; 180/273, 268, 274, 282, 270, 271; 340/667, 436, 438; 296/68.1; 297/216.13; 200/61.53, 61.45 R, 64.45 M; 307/10.1; 73/862.391, 862, 862.581, 862.68

(56) References Cited

U.S. PATENT DOCUMENTS

| | | | |
|---|---|---|---|
| 3,861,710 A | | 1/1975 | Okubo |
| 4,806,713 A | | 2/1989 | Krug |
| 5,071,160 A | | 12/1991 | White |
| 5,161,820 A | | 11/1992 | Vollmer |
| 5,232,243 A | | 8/1993 | Blackburn |
| 5,413,378 A | | 5/1995 | Steffens |
| 5,707,078 A | | 1/1998 | Swanberg |
| 5,746,467 A | * | 5/1998 | Jesadanont .................. 296/68.1 |
| 5,785,347 A | * | 7/1998 | Adolph et al. ............... 280/735 |
| 5,892,193 A | * | 4/1999 | Norton ..................... 200/61.53 |
| 5,895,071 A | * | 4/1999 | Norton ........................ 280/735 |
| 6,161,439 A | * | 12/2000 | Stanley ................... 73/862.391 |
| 6,260,879 B1 | * | 7/2001 | Stanley ........................ 280/735 |

FOREIGN PATENT DOCUMENTS

DE          3809074 A1      10/1989

* cited by examiner

Primary Examiner—Thomas G. Black
Assistant Examiner—Ronnie Mancho
(74) Attorney, Agent, or Firm—Krieg DeVault Lundy LLP

(57) ABSTRACT

An apparatus for preventing occupant injury during accident has various features to ensure safety. A sensor (70), detecting seat belt engagement is provided. In addition, there is a means for varying the tension of a seatbelt (17), depending upon the weight of the occupant (110) and the speed of the vehicle carrying the occupant (110). When said occupant (110) seats on any of the seats (17), the load cell switch (18) will close, allowing the load cell output energy to energize the control module (25). The control module (25), after receiving signal communication from any of the said load cells (15), enables the counter (50) to count the number of closed load cell switches (18) before enabling the optoisolator switch (70), to then energize the latching relay (80) to check for the seat belt latching of the occupied seats (10) with closed load cell switches (18) to assure occupants safety. When the switch (18) for the occupied seat (10) is closed, the latching relay (80) circuit will also be energized so that the seat belt (17) for the occupied seat location is checked for buckling. The latching relay (80) circuit and the counter (50) circuit are closed only when an occupant (110) takes any of the seats (10). The latching relay switch (85) is only energized when the counter circuit (50) is closed.

32 Claims, 8 Drawing Sheets

SMART SEATBELT CONTROL SYSTEM

BACKGROUND

The smart seat belt control system is designed to electronically work with the computer system for the advance weight responsive supplement restraint computer system. It is an intelligent device for the new century. The brain of this device is linked to the concept and theory governing the fact that; all safety devices for all types of vehicles should not discriminatorily protect the driver or frontal seat occupants alone. The theory states that, every individual in a moving vehicle is an occupant and every occupant may incur injuries in a collision. Therefore, every occupant on any seat inside the vehicle must be protected.

TECHNICAL FIELD OF THE INVENTION

Seat belts have been used for many years to prevent passengers from injuries in car crashes. Still, people are not paying attention to the importance of the use of the seat belts. Many loved ones have passed away, and many have been injured. The government has tried to make seat belt buckling a law, that all passengers wear their seat belts when riding in a vehicle. Yet, people chose to ride without obeying these laws. Therefore, it is very important to see that seat belt technology be advanced to include these laws. However, these advanced technologies will provide means for locking the seat belt connectors when connected with the vehicle in motion, to prevent occupants from unlatching the seat belts. It is also very important to see that, when a passenger is on any of the seats and not wearing the seat belt, means be provided to shut off the engine until the said occupant is belted. It is also very important to see that, once the occupant is belted, means be provided to alert the driver of the vehicle know of the occupants attempt to unlatch the seat belt while the vehicle is in motion. It is also very important to see that, technologies be advanced to prevent the live of our love one's. The common incessant has been "Speed Kills," "Buckle Up," "Don't Drink and Drive." These are simplistic wordings and attempts need to be made to enhance these doctrines on our daily practices. Therefore, it is the object of this invention to provide means of buckling up before the vehicle could be put in motion. It is another object of this invention to see that all drivers and passengers take precautionary measures and wear their seat belts before the vehicle could be engaged in motion.

BACKGROUND OF THE INVENTION

Despite the increase of the use of seat belts, the estimates of without seatbelt use for 1997 alone were 44 percent passenger car occupants and 49 percent light truck occupants who where involved in fatal crashes without wearing their seat belts. In 1998, about 19 million more people in the United State cultivated the habit of buckling up, but this did not erase the fact that failure to wear a safety belt by others will not contribute to the more fatalities that are overtaking single traffic safety related accidents. Considering the estimation that safety belts have save 9,500 lives each year leaves us with the believe that if more people from the 19 million wore their seat belts, more people could have been saved.

The traditional lab and shoulder belt does not protect occupants when the occupants are not belted. That is the primary reason the airbags and the smart airbags are designed to assist in these conditions. However, the design of the advanced weight responsive supplemental restraint computer system in "Smart Airbag" and the design of the present invention in "smart seatbelt control system" are appropriate in responding to all accidental conditions and to take care of the existing problems. The smart seatbelt control system "SSCS" includes sensors within the seats fixed surfaces and the floor of the vehicle to determine the occupied seats and also the positions of the occupants to enable signal communication thereof. Preventing the vehicle from engaging in motion when any of the occupants is unbelted is the technology behind the smart seatbelt control system, which reduces the risk associated with driving without the seatbelt being buckled. The present invention further eliminates injuries from the after effects of accidents. By letting the seat belt work in collaboration with the airbag, the seat belt appropriation with the airbag is timely, and allows the airbag reaction to collisions be very effective and also prevents passengers from falling forward when an impact is enabled.

SUMMARY OF THE INVENTION

The smart seat belt control works very closely with the smart air bag in the advanced weight responsive supplemental restraint computer system. When the ignition switch is turn on, the computer system will read the information from all the load cells. If the computer picks any weight present on any of the load cells, it will record a "1" in the memory for each assigned load cell that has an occupant. The Spring Control at the Isolator Switch will then deploy a spring carrying current that monitors the contacts of each seat belt connectors. When the current is restricted or cutoff, the spring will retract to unlock the seat belt connectors inside the open fixed end of the seat belt housing. When a passenger is present, the strain age sensors will provide electrical responses to the applied bending, stretching, or compressing. The response will then be transmitted to the computer programmable memory for processing of other task like the seat belt check. Safety seat belts and air bags are the most effective means for reducing the potentials of serious injuries and deaths in automobile accidents. Together with the air bag, they provide some unique potentials of reducing the crash fatalities and injuries to a minimum. Yet, passengers still forget to use the seat belts and sustain fatal injuries in most accidents as a result. For individual protection, seat belts should always be worn before the vehicle is engage in motion and when the vehicle is in motion. Which means some form of electrical energy would have to ignite the starting system of the vehicle. Once the vehicle is started and put to motion, this energy form will regenerate different rate of motion, which is a function of speed. Speed is the main determinant of how serious a crash can be. This speed is what generates the force that human body receives in a crash accident that had an occupant in the vehicle at the time of the crash.

However, it is true that people take forces of impacts for jokes, but without the use of seat belts and air bags on high-speed accidents, kids and pregnant women will always be punished by a very little impact force. Therefore, it is important that seat belts be worn always by all occupants in the vehicle. The proper positioning of the seat belt on occupant's body is very important during crashes, to give the occupants maximum protection and reduce the bodily injuries that one can sustain without these protections. Improper positioning of the seat belt can also cause injuries during accidents. However, without the seat belt, frequently people will loose their lives. Therefore, occupants should always wear their seat belts and observe all the regulations and attachments about the seat belts. Children and all occupants need protection when riding in a vehicle. So, it is a practical idea to see into it that, all children and vehicle occupants are restrained when riding in any vehicle. If a child or any occupant is not restrained, during accident, the occupant may strike the interior part of the vehicle. It should have been suggested that car safety restraints are designed in a way that would prevent the vehicle from starting, if any or all of the occupants are not belted. However, the present invention is designed to protect every individual in the vehicle.

Also, it prevents the vehicle from starting if any or all of the occupants are not wearing their seat belts. In addition, the present invention is designed to protect every individual in the vehicle. In part, it will prevent the vehicle from starting when any or all of the occupants of the vehicle are not wearing their seat belts. The processor will check to make sure that all occupants are belted. If any of the occupant is not wearing the seat belt, the processor will assign a "0" signal to the control module to initiate the shut off of the ignition switch. The control module will then activate an audio visual or human voice response to alert the driver of the vehicle about the specific seat location number bearing the unbelted occupant. If the occupant is still not belted, the control module will then energize the cutoff switch that will shut off the engine "5" minutes after the human voice response. The time to shut off the engine is adjustable, so that different states or the government could regulate the cutoff time. The computer system is programmed to recognize the number of seat belts that are available and the number of occupants that are supposed to fill the seats, through the use of the counter or accumulator. The counter is embedded inside the seat belt processor and receives all the load cell signals each time an occupant takes any of the seats. All signals are in binaries with lots of transistorize switches kicking on and off on time for the signals to be transmitted to other devices. The present invention is a smart seat belt buckling system that senses and recognizes the number of occupants that are on the seats. The control module signals the cutoff switch when any of the occupants is sensed to be unbelted. Once the seat belt is buckled and the vehicle in motion, a magnetic switch mechanism (magnetic cylinder) will activate a lock. The lock is to prevent the occupants from unbuckling the seat belts until the vehicle comes to a complete stop and the key switch turned off or the override switch pushed in. When the seat belt is buckled, the optoisolator switch will enable electrical means that will activate the lock that will keep the seat belt fixed end and the moveable end in place, to prevent unbuckling of the seat belt while the vehicle is in motion. That is, once the engine is started and the occupants are belted, they will not be able to unbuckle the seat belt unless the engine is shut off or the override switch is closed. When the override switch circuit is closed or the ignition switch turn off, the magnetic cylinders will then de-energized the magnetic field. The applicant understands that many attempts have been made to improve on the automotive safety through the use of seat belts. The applicant also understands that once the seat belt is buckled, occupants occasionally get to the habit of unbuckling the seat belts. This type of behavior makes the seat belt useless and very chance taking when riding in a vehicle, when considering the number of unpredictable accidents that occurs daily. Therefore, it is the object of this invention to totally and precisely protects all occupants from unbuckling the seat belt when the vehicle is in motion or the engine running. It is understood that the object of this invention is not only to protect the driver alone, but also to protect every occupant therein. The present invention does not prevent the ignition key from being inserted into the keyhole of the starting switch. The smart seat belt control system will let the driver insert the ignition key into the key slot, but other devices will check and count the number of occupants in the vehicle. Once the number of occupants is known, the seat belts on the counted seats will be checked for proper latching. If any occupied seat is found unlatched, a human voice chip will be activated to release a human voice-warning signal to warn the driver about the unlatched seat belt. The human voice chip will also release the specific seat number that has the unbuckled occupant.

The load cell will always check for the presence of an occupant. If the occupant is present and is a child, the processor will realize this fact through load cell to processor signal communication and check to make sure that the child-seat is properly secured and tensioned. The occupant seating position counter will assist the seat belt processor in knowing the number of occupants that are in the vehicle. It will also identify the seat locations that have the unbelted occupants and carry the signals to the processor. Also, the counter will carry all its counting in the batch mode and allow the BIOS to talk to the processor. All the other, devices use the BIOS to communicate to each other through signal communications. Accordingly, each time any of the load cell circuit is closed, the counter will signal the processor, which will then use the BIOS to process other switches to check for the seat belt buckling for the occupied seats. The counter will stop counting when the load cells are on their no occupant mode or opened circuit.

The processor will record in the memory, the number of seats counted every time the counter output a signal to the processor's input. The input signal to the seat belt processor is what the processor uses to feed in the other devices so that a proper and accurate protection can be ascertained. As the counter picks signals from the load cells, the other switches are energized to carry on their tasks. The voice chip is incorporated in the control module to warn of the unbelted occupant when detected. The voice chip response is the first output signal when an occupant is detected for not wearing the seat belt. The output latch relay will open at the end of each count, enabling the other switches to be processed. The control module will also check for the operation of the other devices and switches. If any malfunction switch is detected, the voice chip relay will activate a user define messages indicative of the problem quo for possible repairs. The control module will also check the optoisolator switch. If the seat belt is latched, the optoisolator will send a "1" signal to the control module to stop processing. If the seat belt is not latched, the optoisolator will send a "0" signal to the control module to continue processing. That is, the optoisolator controls 1/0 for isolation. The optoisolating circuit uses a light emitting diode "LED" connected to the output of the isolator to suggest activation of the seat belt to the control module input. If the signal is "0." the control module will send a warning human voice signal out to the driver, addressing the seat number and the unlatched behavior of the occupant. The cutoff switch will then be energized if the occupant is still not belted. The boot program for this computer device ROM and BIOS chip will always check to see if there is any occupant on any of the seats. All the information will then be sent to the address line. The boot manager also assumes control of the start up process and loads the operating system into ROM. The operating system chip works with the BIOS to manage all operations, execute an programs, and respond to signals from the hardware. Lots of transistorized switches are used in the present invention to create and transmit binary information for logical thinking inside the computer and speedup signal communication therein.

When the seat belts are connected, the mobile connectors for the seat belts will activate a magnetic switch. This switch will automatically signal the computer control module that the occupant is belted. The signal for an occupant present is "1," and a "0" signal for an unbelted occupant. The seat belt actuating switch could be of different types. A "1" transmission is when the seat belt circuit is closed A "0" transmission is when the seat belt circuit is opened. The seats are coded so that the computer counter can tell the exact seat number that has the unbelted occupant. An insulated cable that has an attaching block and terminals at each end is assigned to each seat belt positive ends. When the occupant is not belted, the circuit will be opened. And when the occupant is belted, the circuit will be closed, thereby letting current to flow through the coded line to the computer processor for the seat belts. The double circuit system for the processor lets the processor read the "0s" and the "1s" in two-wire process. That is, two wires will enter the circuit, and if there is a current from the coded line, the line will leave with a "1" from the terminal. If there is no current, it will leave with a "0" from the other terminal. In case of any current failure, the seat belt can be disconnected manually, by recognizing that there is a "0" reading at the isolator. The arrangement of the electrically conducting wires for the seat belt circuit, which are used for signaling the computer when in closed or opened circuit, initiate a lock when closed. The lock is to keep the seat belt connectors locked at all times while the vehicle is in motion. That is, with the closed circuit occupants will not be able to disconnect the seat belt until the circuit is opened. This can only be done in two forms;

(1) The driver has to come to a complete stop and turn the key switch off to let the occupant unlock or unlatch the seat belt.

(2) The driver can come to a complete stop, while the engine is idling; he can use the omitting switch (override switch) to let the passenger unlatch the seat belt by pushing in on the switch. The override switch is a push-in button type switch. When pushed in, it opens the circuit, thereby disconnecting the flow of current and also breaking the field for the magnetic lock. This lock can be designed to use different locking means, which also includes a plunger locking means.

The opening of the latching circuit could only be enforced when there is a restriction to current flow. This restriction is initiated by the omitting switch (override switch) or by the key or ignition switch in the off position. The smart seat belt control system uses these protective measures to extend the protection of occupants in all types of vehicular accidents. In addition the smart seat belt control system is so unique in that, it works in an automatic mode once the passenger takes any of the seats. That is, solely the presents and actions of the occupants transmit all signals while the vehicle is in motion. The seat belt edges are made of coated fine material. This is to prevent occupants from being cut by said seat belt edges when the vehicle is involve in an accident with the belt tensioned. The load cell, together with the optoisolator and the CPU, reads the occupant's weight, the vehicle current speed before the accident, and calculates the safe seat belt tensioning. This tension, which is weight dependent, is the applied tension that is required to hold the occupant on the seat, and give the air bag enough room for more effective deployment. The input-voltage to the seat belt circuit will decide the opposition to the flow of current. This current is monitored and compared to the ratio of the resultant current that leaves the circuit. The circuit is used to achieve the impedance matching for each seat belt. It also allows signals to be transmitted to human voice signals when the seat belt is tempered while the vehicle is in motion. The smart seat belt control system can also incorporate a multiplexing technique to assign signals to all specific seat belt locations or paths. This technique uses a time division to provide independent transmissions of the several pieces of information about the passengers. The information is shared on time with the computer and the driver at frequent intervals. All the signals are transmitted through a normally opened switch mode, which occur when the occupant is present and not wearing the seat belt. A normally closed circuit is enabled when the occupant is present and wearing the seat belt With the closed circuit, the sensors for each location will be in series so that the same current will be running through the system, until another occupant takes the other seats. When the seat belt is not worn, the circuit will be opened and an alarm or a human voice-warning signal will be transmitted for that seat belt location. When the said circuit is opened, the sensors will be in parallel. Accordingly, when the occupant latches the seat belt, the sensors will be activated, the circuit will then be closed, enabling current that will then activate the control module to disable signal communication to the cutoff switch.

The ignition switch for the vehicle is designed to energize the accessories of the vehicle. The exact arrangement for the smart seat belt control system depends on the number of seat belts that are in the vehicle. The sensitivity of the seat belt in relation to the key switch is set so that the seat belt will not trip the key without a person on the seat. One set of contacts for the key switch is assigned to each seat in the vehicle. Each time a passenger takes any of the seats in the vehicle, one set of contact will be closed for the air bag and the other opened for the seat belt, until the passenger latches or buckles up. With the opened circuit, the driver will not be able to start the vehicle. Which means future vehicles will prevent drivers from letting their vehicles idle for a long time without the driver's attention. That is, when the driver is not on the driver's seat while the engine is idling, the switch on the driver's seat will stay open. Thereby transmitting a "0" signal to the control module which will then activate the cutoff switch. Another advantage and uniqueness of the present invention is that, not many deaths will occur because vehicles were left running in garages while the drivers were upstairs sleeping. Many have been killed with their entire family by inhaling the exhaust fumes, because the drivers left their vehicles running unattended while they were upstairs. Besides, some people have the tendency of letting their vehicles idle for a long time unattended. In some way, this practice is hazardous to our health and our environment However, the present invention in "smart seat belt control system" invention also controls the maximum idle time that a vehicle can run when left unattended. If the vehicle was already running, with the opened circuit, the control module will energize the cutoff switch and the engine will shut off if the driver is not on the seat, or the passenger is still not belted. The weight reaction on the driver's seat will energize the coils of the other seats. When the driver is seated, the circuit on the driver's seat will close, letting the control module know that the driver is seated while the engine is idling.

In all, if there is an occupant in the vehicle and the occupant is not on the driver's seat, with the driver's seat being vacant, the control module will still shut off the engine until the driver takes the driver's seat. The seat belt processor has a counter that detects the seat that has an unbelted occupant and sends that signal to the control module. The control module will then signal the cutoff switch that will later shut off the engine "5" minutes after the warning signal is broadcast. With the present invention, the driver will not be able to start the vehicle unless the occupant is belted or the driver is on the driver's seat. The control module has a simple timing circuit that controls the amount of time to cutoff the key-switch if the passenger is still not belted.

The arrangement for the smart seat belt control system allows the audio messages to come on first, to let the driver know about the behavior of the passenger before the engine is cut off. With this arrangement, if the passenger decides to put the seat belt on after the audio warning signal, then the circuit will close and every other circuit will return to normal. However, with the advanced technology in the smart seat belt control system, once the seat belts are connected or latched, with the ignition key on, passengers will not be able to disconnect the seat belts without the key-switch in the off position. Also, the driver could let passengers disconnect the seat belt with the use of the omitting switch (override switch), which will let the passenger off while the engine is still running. Another unique advantage of this smart seat belt control system invention is that it has no provision for an unbelted occupant. The time switch is connected in parallel with the key switch and carries the omitting switch (override switch) which is used to let off passengers. The same computer system for the Advanced Weight Responsive Supplemental Restraint Computer System for the air bag deployment is programmed to keep track of the unbelted occupants with the use of these incorporated devices. That is, if the occupant is not belted, the computer will pick the signal and process other devices to react to the unsafe practices. Some many advantages of the smart seat belt control system are that, there will be no increased air bag pressure due to the fact that the occupant was not belted. Besides, if the air bag pressures are increased to protect unbelted occupants, there will be no protective limits for bigger or smaller occupants. However, a new technology in the air bag industry has a variable control to give each individual a force that is proportionate to the individual's weight. So, by implementing the smart seat belt control system, occupants of all ages and sizes will be well protected with this smart seat belt control system and the advanced weight responsive supplemental restraint computer system's technology.

Again, all occupants are protected with this advanced seat belt technology in smart seat belt control system, despite the frontal or rearward seating position. That is, whether the occupant is seating in the front or at the back seat, they will all be protected by the smart seat belt control system. This smart seat belt control system does not discriminate by protecting only the driver. It does protect every occupant in the vehicle. The smart seat belt control system will let the car start if the driver or the occupant is not wearing the seat belt, but the system will shut off the engine if the driver attempts to engage the vehicle in motion with any of the occupant unprotected. The smart seat belt control system will not let the engine start if the driver is not on the seat. With the advanced weight responsive supplemental restraint computer system, the inflation pressure of the air bag is safely controlled by the individual occupants on the front seats. While the buckling of the seat belts is monitored by the seat counter that checks all the seats for proper and safe buckling. Which means, the size of the occupants on the front seats, and not the absence of the buckling of the seat belts will generate the increasing inflation pressure for the air bag. Besides, the seat belts will always be buckled with this advanced technology. In addition, occupants will not suffer the presence and effect of the excess air bag deployment pressure with the presence of the smart seat belt control system. Protectively, the smart seat belt control system together with the advanced weight responsive supplemental restraint computer system guarantees a total safety for vehicles with air bags. Gratefully, vehicles without air bags will have their occupants well protected. Also, the smart seat belt control system does not only control the driver's seat belt latching but also controls the other seat belts and seating positions of the vehicle. This also prevents the vehicle from starting when there is no body on the driver's seat. Once the engine is started, the smart seat belt control system will also controls the entire safety devices and prevents the driver from driving the vehicle when there is an unbelted occupant.

Another unique future for the smart seat belt control system is that, once the seat belt is latched and the engine running, occupants will not be able to disconnect or unbuckle the seat belt when the vehicle is still in motion or the engine running. This means, occupants will always have their seat belts on at all times when the engine is running or the vehicle in motion. Any attempt to latch the seat belt for the sake of starting the vehicle will prevail with the present invention. This is because once the seat belt is latched while the engine is running or the vehicle in motion, the occupant or driver will not be able to disconnect the seat belt until the vehicle comes to a complete stop and the ignition switch turned off. However, prior attempts have been made to safeguard the life of the driver by not letting the engine crank if the driver is not belted. With these attempts, only the life of the driver is protected. Also, with the prior attempts, once the engine is started, drivers can still unlatch the seat belt and still be able to continue driving without the driver or the occupants being protected. Accordingly, the smart seat belt control system is not discriminative in that it protects every occupant in the vehicle. Some object of this invention is to prevent the vehicle from starting when there is no person on the driver's seat. Another object of this invention is to cutoff the engine if the driver leaves the driver's seat with the engine running for more than a specified time. That means, vehicles will not be started if the driver is not on the driver's seat, even if all the occupants are belted. Which means, when the driver leaves the driver's seat, kids on the passengers seats will not be able to start the vehicle when there is no one on the driver's seat. In part, the programmable memory will prevent kids of certain weight range, with the incorporation of the load cell, to get on the driver's seat and attempt to start the vehicle. The presence of any occupant will energize the load cell. The load cell in turn will energize all the other switches after the presence of the said occupant is noticed. The counter to make sure that the occupants are belted will then check the switches. If the occupants are not belted, the counter will inform the seat belt processor to enable signal communication. The seat belt processor will then signal the control module, which will then energize a human voice chip warning response. At the end of the warning communication, if the occupant is still not belted, the control module will activate the cutoff switch and the engine will then be shut off after "5" minutes or at the programmed time. The same uniqueness of this state of the art invention of the smart seat belt control system follows that; no interference will exist between the insertion of the ignition key and the ignition key switch. The smart seat belt control system will rather prevents the occupants from unlatching the seat belt once the engine is running. Giving every occupant a total protection with the uniqueness of the advanced weight responsive supplemental restraint computer system.

The decision making for the air bag in advanced weight responsive supplemental restraint computer system will let the smart seat belt control system to function automatically. The system is programmed to cutoff the engine "5" minutes after the normal audio warning of the unbelted occupant or at the programmed time. The computer keeps track of everybody in the vehicle with the use of the load cell, to make sure that all the occupants are protected. A detailed record is provided for any presence of an occupant. The rapid decreases in cost for microprocessors and associate elements are bringing the computers system into almost every advanced safety and technologies. Therefore, the development of this advanced passenger restraint is less costly, very affordable, and will allow every passenger and driver to stay within the law. A device like the smart seat belt control system will be exceptionally hard not to be used by occupants. This device also will constitute significant differences to the fatal accidents and injuries. The low cost of the microprocessor of this device is what is leading to the development of what is called "SMART PASSENGER RESTRAINT." The smart seat belt control system is based on its ability to monitor the presence of the passengers on any of the seats, compares the belted information and the unbelted information with the data in the memory. It will then decide whether any of the two groups of information agrees with the stored data that has been programmed in the memory.

When the passenger is present the computer will read a "1." If the computer sees a "0" at the seat belt data, it will know that the passenger is not belted and will immediately signal the chip that has the stored human voice audio signal to response to the exact condition, for the exact message to be amplified to the driver.

The principle to this smart seat belt control system is based on the electronic line signals by the electronic control module. The signals are in analog, which varies with the amount of current at various seating points where seat belts and load cells are assigned. These signals are compared with the preset signal levels to form a digital signal, corresponding to the difference in the presence or absence of the passenger on the seat belt location. The digital signal is then compared with the actual current level corresponding to the seat pattern and the preset current level. By programming the current level to correspond to the configured seats, this device will not only protect adults, but will also protect any kid or person on the seat, regardless of the size. Since the output is a digital signal, this device can be programmed to check the locks at various high-speed crashes and also record the speed before the crash. That is, this computer device to help detect the crash speed, would record the speedometer reading before the crash. The omitting switch (override switch) is mounted on the dashboard. This switch is of the push in type, which is used for letting passengers off. When any of the seat belt is connected, the little current that signals the computer will create a magnetic contact between the two metal connectors of the seat belt that will keep the latches locked at all times when the engine is running. When the belts are connected, a phototransistor and a light emitting diode "LED" will face each other across the open slit of the optoisolator switch. This diode is a simple switch, which is energized when the applied voltage provides a forward bias. The optoisolator is an optical-coupler, which consist of a light emitting diode "LED" input, optically coupled to a photocell. The photocell resistance is high when the LED is off "0 signal" for an unbelted occupant and low resistance when the LED current is on "1 signal" for a belted occupant. The interface circuit for the photocell measures the light intensity inside the optoisolator. The op-amp is the signal-processing interface between the photocell and the latching relay. This op-amp also compares the buckling switch on the LED when the seat belt is buckled, and the unbuckled signal when the seat belt is not buckled. The photocell is a sensor or transducer that converts light or optical energy into electrical energy so that the motion of the seat belt can be properly monitored. The optoisolator circuit monitors the light-intensity inside the fixed end of the seat belt and switch on the LED when the occupant is not belted. When the occupant is not belted, the light intensity will drop below the specified level. The conductivity or resistance of the photocell inside the optoisolator circuit changes under light exposure. This light exposure is initiated from the load cell switch when closed. Cadmium Sulfide "CdS" could be used for the design of the photocell. When the occupant is belted, the resistance will decrease while the light intensity will increase. The counter and the latching relay will then be energized. The interface circuit will then give an output voltage that is proportionate to the light intensity. This output voltage will also be proportionate to the load cell out put voltage. This voltage is then used to energize the coils of the seat belt tensioner so that a proportionate tensional force is ensured when the vehicle is involved in an accident. The generated voltage from the load cell's output is proportionate to the inverse of the resistance.

The control module is required to control the energy source of the switches. This control module will have the ability to control large amount of power with a minimum of control energy. Also, different types of control module may be used, but the description of the workability of the module employed in this process, calls for a control module that will conduct power in either one or two directions. However, only the module that conducts current in both directions will be mentioned.

The thyristor, which is a silicon-controlled rectifier, may be used for the control module process. Although there are other types that may work equally, only the thyristor will be mentioned in length. There are many types of thyristor that could be used. A thyristor is just like a diode with the exception that it can be turned on at any point in the circle. The thyristor has three terminals; the anode, cathode, and gate work in a defined sequence. That is, a current pulse is applied to the gate to start conducting.

Once conduction is started, the pulse is no longer necessary, and the silicon controlled rectifier will remain in conduction until the current goes to "0" or some other means is used to force it to stop the conduction process. The triac thyristor that could be employed for this design consists of two silicon controlled rectifiers back to back. This allows current to flow in both directions when turned on. In addition, the triac is readily available in current rating to specific amps and also in voltage ratings. Accordingly, this triac thyristor consist of electrical isolation "optoisolation" so logic level voltages can turn it on. It turns on at the first voltage zero "0" after the control voltage is applied and the seat belt latched. It turns off at the first current zero "0" after the control voltage is removed or the ignition switch in the off position or the override switch pushed in. This will also prevent transients or voltage spike on both the source and the load. The silicon-controlled rectifier is used because of the fast switching speed needed to keep every body informed of the necessary safety measures. The triac is very capable of providing such an adequate speed. In all, the silicon controlled rectifier works very closely with the computer logic circuit. The seat belt latching circuit also measures light intensity from the load cell as a signal communication that an occupant is present. An op-amp is also used as a signal-processing interface between the optoisolator and the latching circuit. This op-amp also compares the light emitting diodes "LED" for latching purposes when the load cell circuits are closed. When the seat belt is connected, the blinder will lick out. That is, the blinder will not be inserted into the slit when the seat belt is latched. The transistor will see the LED and energize a magnetic field between the two connectors of the seat belt. When the key switch is off, or when the omitting switch is pushed in, the blinder will insert into the slit to disconnect or break the magnetic field. This will allow the occupants to unlatch the seat belt in an attempt to get out of the vehicle. Also, when the seat belt is not connected, the blinder will insert into the slit and the computer will know through signals that the seat belt is not connected. The seat belt magnetic switch is embedded inside the optoisolator switch which is mounted on the fixed structural side of the seat belt. The applicant understands that the arrangement of the magnetic cylinder and the blinder can be configured differently. But the concept behind the smart seat belt control system is what the applicant is further claiming, to structurally safe the live of our love once in future accidents. The multi-mode control module will pick signals from the seat belt processor. The counter tells the processor the number of unbelted occupants in the vehicle and the seat location of the said occupant. Again, the key switch, when turned on, and the seat belt connected, sends current to the isolator that will create magnetic field lines at the ends of the seat belt connectors. The field lines are strongest at the ends when connected and the engine running. The blinder will break the magnetic force each time the omitting switch is pushed in or the key switch turned off. There are lots of other locking system that could be used, as is mentioned that, some of the object of this invention is to prevent occupants from unlatching the seat belt when the engine is running or the vehicle in motion. Another object of the present invention is to shut off the engine when the vehicle is involved in any type of accident, preventing the pressurized fuel lines from busting out and fuel reaching the exhaust pipe or any other hot spot around the fuel lines and course flames. The control module will also receive signals from the vibration sensor for rollover type accident, and from the collision sensor in frontal or rear-end type accident and activate the cutoff switch. Some of the many reasons why this state of the art smart seat belt control system shut off the engine is because drivers get panic when an accident occurs and lost control of directing the vehicle. By shutting off the engine will reduce the other consequences that are associated with panicking on the steering wheel. Also, on very severe accidents, fluid lines sometimes give away due to increased pressure on the lines caused by the impact force of the collision. With the exhaust temperature at certain degrees or any occurring sparks around the engine, a leaking fuel line will initiate flames and the vehicle will go on fire. Therefore, it is another object of this invention to eliminate further accidents and fatalities after the initial accident. This smart seat belt control system will let the control module activate the shut off system seconds after the air bag had deployed. The line of force is continuous between the north and south poles of the seat belt connectors.

This line of force or current flow draws these poles together to keep the seat belt locked at all times, when the vehicle is in motion. The material used for the seat belt connectors would have high permeability that will allow the material to conduct magnetic flux. The magnetic flux density will measure the concentration of the magnetomotive force of the seat belt connectors. That is, a strong magnet will depend on the heavy concentration of the magnetic flux. The electromagnetic reaction is temporal in this smart seat belt control system device. When current flows through the other end of the seat belt, and the connectors are latched, they become electromagnet.

The latching of the seat belts carry the principles to the operation of the seat belt activation of the optoisolator switches. The seat belt optoisolator switch linkage to the control module is energized when the ignition switch is closed. Once the control module is energized, the cutoff switch circuit will close, holding the control module in the energized state. When the occupant is not wearing the seat belt, the seat counter checking circuit and the latching circuits will close for that seat location. The cutoff switch will then be opened for the engine to shut off "5" minutes after the warning message. Seat belt switches 1, 2, 3, 4 use logic functions to close and open the counter and the latching circuits. That is, if the passenger is present and wearing the seat belt, the switch will be closed for that seat location. If the passenger is not wearing the seat belt, the switch will be opened for the said seat location. The counter will then receive a "0" logical signal for the unbelted seat location and inform the processor that the occupant on that seat location is not wearing the seat belt. The processor will then notify the control module, which will then activate the chip to emit a human voice response, and a warning massage will then be voiced out. The control module will always activate a human voice message whenever the circuit for the seat belt location is opened. The ignition switch is connected to send power to the entire system of the present invention. All the components of the smart seat belt control system device are so sensitive in that, tempering with the seat belt connecting ends will not activate the system. Instead, it will audibly warn the driver that the occupant on the said seat location is tempering with the seat belt. Also, a vibration detector is attached and linked to the system to sense rollover type accidents and activate the cutoff switch to shut off the engine. The effectiveness of the vibration sensor or detector will depend on the proper application and programmed installation. The use of the cutoff switch in any collision or rollover type accidents is to prevent fire hazards or any other type of accident that may occur after the original or initial occurrence. Therefore, proper adjustment of the sensitivity of the vibration system is necessary to avoid false cutoff from vibration caused by bumps. In addition, all accidents that are severe enough to activate the air bag will trigger the cutoff switch "5" seconds after the air bag had deployed. This is to prevent the engine from continuous idling and also to stop any other accidents that could result if the engine stays running after the accident. The time switch provides no time for an unbelted occupant. The advantage of the time switch in the present invention is to make sure that every occupant riding in the vehicle is protected. The time delay gives the occupant enough time to comply with the law of wearing seat belts when riding in a vehicle. Through out the delay time, the warning massage will be operative for the time duration of the programmed delay intervals. After the delay time has elapsed, the control module will energize the cutoff switch and the engine will shut off when the programmed time elapses. The time switch is connected in parallel with the cutoff switch. When the warning signal is operative, the cutoff switch circuit will stay close. After the end of the delay, or the end of the warning message, the cutoff switch will then kick open and the engine will be shut off if the occupant is still not belted. If the occupant decides to wear the seat belt during the delay, the time switch will be opened and the cutoff switch will then be closed. The computer keeps track of all the activities around the occupants, the air bag, and the seat belt functions. The computer is programmed to check the seat belt latches on any of the occupied seat. The load cell provides a unique information about the occupants present. However, the entire device is designed to monitor the wearing of the seat belt before the vehicle is engaged in motion to ensure that the occupants stay belted and safe, while the vehicle is in motion.

Vehicles without air bags can also take advantage of this smart seat belt control system. That is, the smart seat belt control system can use different sensors to sense the presence of an occupant even with older vehicles that have no air bag. In all, the smart seat belt control system device can be readily installed in older vehicles.

The time constant for the time delay is very important in this smart seat belt computerized device because the timing and the warning response time determines the performance of the smart seat belt control system. The device can use different time constant circuit. However, only the RL time constant will be described here, to carry the programmable assignments. The RL time constant is the inductor and resistor that are used to design the time circuit for the advanced weight responsive supplemental restraint computer system and the smart seat belt control system. When current is flowing in the inductor, the current generates a magnetic field buildup around the inductor. If the current is interrupted, the magnetic field collapses very quickly. The magnetic field is allowed to collapse at a controlled rate by an intermediate condition between maintaining the magnetic field and allowing it to collapse rapidly. The resistor determines the rate at which the magnetic field collapses. This time constant is a measure of the time required to broadcast the audible human voice warning message and the time to shut off the engine. The time constant is the specific amount of time required to obtain 100% of the programmable task of the smart seat belt control system.

Power line transients are ensured to protect any failure within the computer and the electronics. When a passenger seats on any of the seats, the passenger will input a present-signal on the load cell. The load cell circuit will then close and output the occupant present-signal that will energize the seat belt check-switch or counter. The counter will then check to make sure that the switch for the occupied seat is closed. When the switch for the occupied seat is closed, the latching relay will be energized to check if the seat belt for that seat location is latched. The seat belt check-switch or counter is closed only when an occupant takes any of the seats. The latching relay switch is only energized when the seat belt check-switch is closed. The energizing of the latching relay is momentary. Therefore, each time the latching relay is energized, switch "A" will be closed. Once the latching relay is energized, contacts "B" will close, holding the latching relay in the energized state after switch "A" is opened. All the other contacts will follow the same sequence of operation. The seat belt and the latching relay are arranged so that the contacts of seat 1, which is the driver's seat, will supply power to the coils of seat 2, seat 3, and seat 4. The computer is programmed to recognize a pattern of switches, and no occupant will be able to start the vehicle if the occupant is seating in any seat other than the driver's seal That is, the smart seat belt control system technology is one of the best technologies designed to protect all occupants of all sizes.

The moveable end of the seat belt has a built in coil in its housing which is rotate-able. The coil is property winded on two shafts that have wheels at each end. The wheels are rotated as the coils receive collision signal from the collision sensor. A stopper plunger is engaged between the wheels when the coils complete its windings. The seat belt processor energizes the winding of the coil. That is, the occupants weight from the load cell and the speedometer information of the vehicle are send to the CPU that will compute the tension needed to keep the occupant on the seat when the vehicle is involve in a collision. The computed tension for the said occupant is then sent to the seat belt processor that will program the coil for that seat belt housing to rotate and tension the occupant appropriately on the prescribed seat location when a collision is sensed. The other object of this invention is to ensure maximum seat belt tensioning means that is sufficient enough to keep the occupant on the seat without causing any further injury to the occupant, or let the occupant be thrown out of the seat on impact. The tensioning of the seat belt and the tension on the belt are proportionate to the weight of the occupant on the prescribed seat location.

Another object of this invention is to provide a maximum supporting load that will hold the occupant on the seat during collision, while reducing the load acting upon the wheels. The stopper takes out much of the load acting upon the wheels when engaged.

The occupant's measured weight is very useful to measure the power to the coils of the rotating end or the seat belt tensioner. This power is so divided to signal the tensional circuit to energize the tensioning coil to rotate and tension the seat belt at a tensional force that is sufficient to hold the occupant on the seat. The energy to the coil of the seat belt tensioner is only necessary when the vehicle is involve in a collision of the prescribed magnitude. Very little current will be made constant at the coil. When the occupant's weight is input on the load cell the load cell will then out put this weight in voltage readings. All the voltage readings for the smart seat belt control system and the advance weight responsive supplemental restraint computer system are very small and they are read in milivolts. When the collision sensor sends a collision signal to the seat belt processor, the seat belt processor will signal the tensioning coils on the occupied seats so that the coils could be energized and adjust to the appropriate tension needed to safe-guard the occupants from injuries. The unique object of this portion of the invention is to provide a variable tensioning means, since occupants are thrown off their seats with different forces for their different weight values. That is, for each occupant the power needed to rotate the coil to provide a safe tension on the said occupant upon collision is $P=I*E$. The voltage from the load cell is E. This voltage is the occupant's weight value and all the computations of the rotations of the coils are carried on in binaries. The voltage E, multiplied by the constant current I, provides the necessary pressure that is needed to activate the coil to generate a tensioning force that would be compared to pounds per inch, sufficient enough to hold the occupant on the seat without causing any further injuries. The coil will receive a constant current I, and upon receiving the weight signals in voltage reading E, will influence the number of rotations of the coil that will safely protect and tension the occupant, without causing any further injury to the said occupant. The ground for the coil is located at the mounting casing of the coil housing.

The heart of the smart seat belt control system is the interface module inside the control module that communicates with the seat belt processor and converts the weight of the occupant and the collision force input into series of signals that the coil can handle. These signals are then sent to the coil tensioner to act upon, and influence the appropriate number of rotations of the coil that will initiate the amount of tension of the seat belt that will then keep the occupant on the seat when a collision is sensed. Signals may be sent in one wire at the same time. The transmission of the signals in this multiplexing technique would prompt other devices like the air bag accelerometer to programmable select only the signals that are intended for its use.

In the process of trying to determine the cost of building the smart seat belt control system, seat belt manufacturers would realize the very low cost. As it is seen that the same parts are used for the control of the smart airbag deployment force and the smart seat belt control system. The computer system for the advanced weight responsive supplemental restraint computer system is designed to accept the components of the smart seat belt control system. Therefore, the only additional future to the computer is the seat belt processor, the variable electronic tensional coil, the latching relay, and the optoisolator. All the other components are designed to work as described in the body of the present invention, to better improve on automotive safeties. These advanced weight responsive supplemental restraint computer system and the smart seat belt control system technologies, are the DY-2Ksmart. Where the airbag, DY-2KsmartA, is differentiated with respect to A, dY/dA=2Ksmart and the seat belt, DY-2KsmartS, is differentiated with respect to S, dY/dS=2Ksmart. Together, they are DY-2Ksmart. A technology designed for the next century.

In all, the present invention is the advancement of occupant's protection to automotive safeties. Accordingly, it is a principal object of the invention to provide a supplemental restraint system having an accurate weight sensor to determine the presence and weight of a passenger.

It is another object of the invention to provide a correlation between the weight of the passenger and the deployment characteristics of the air bag.

Some of the other objects of the present invention are the many advantages as they are introduced in the art:

Occupants are programmed to always wear their seatbelts.

There will be no increased airbag pressure due to the fact that the occupant was not belted.

Vehicles without airbags will have their occupants well protected.

The engine is shut-off when any occupant is detected unbelted.

The connectors are locked when the vehicle is in motion to further protect occupant's unsafe habits.

All the seatbelts are monitored when the ignition switch is turn on.

The system has 100% occupant's awareness and protection before the vehicle is engaged in motion.

The occupant to driver communicating means in relation to the seatbelt latching and the vehicle being in motion is unique.

The engine will cut-off and will not restart if the occupant is not belted.

Occupants will always be held on their seats at all times while giving the airbag time to deploy more effectively.

The engine is cut-off at a preset time when the driver is not on the driver's seat, thereby preventing carbon inhalation at home garages if left idling unattended.

The development of the smart seatbelt control system is less costly and more effective in fatality reduction.

These and other objects of the present invention will readily become apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
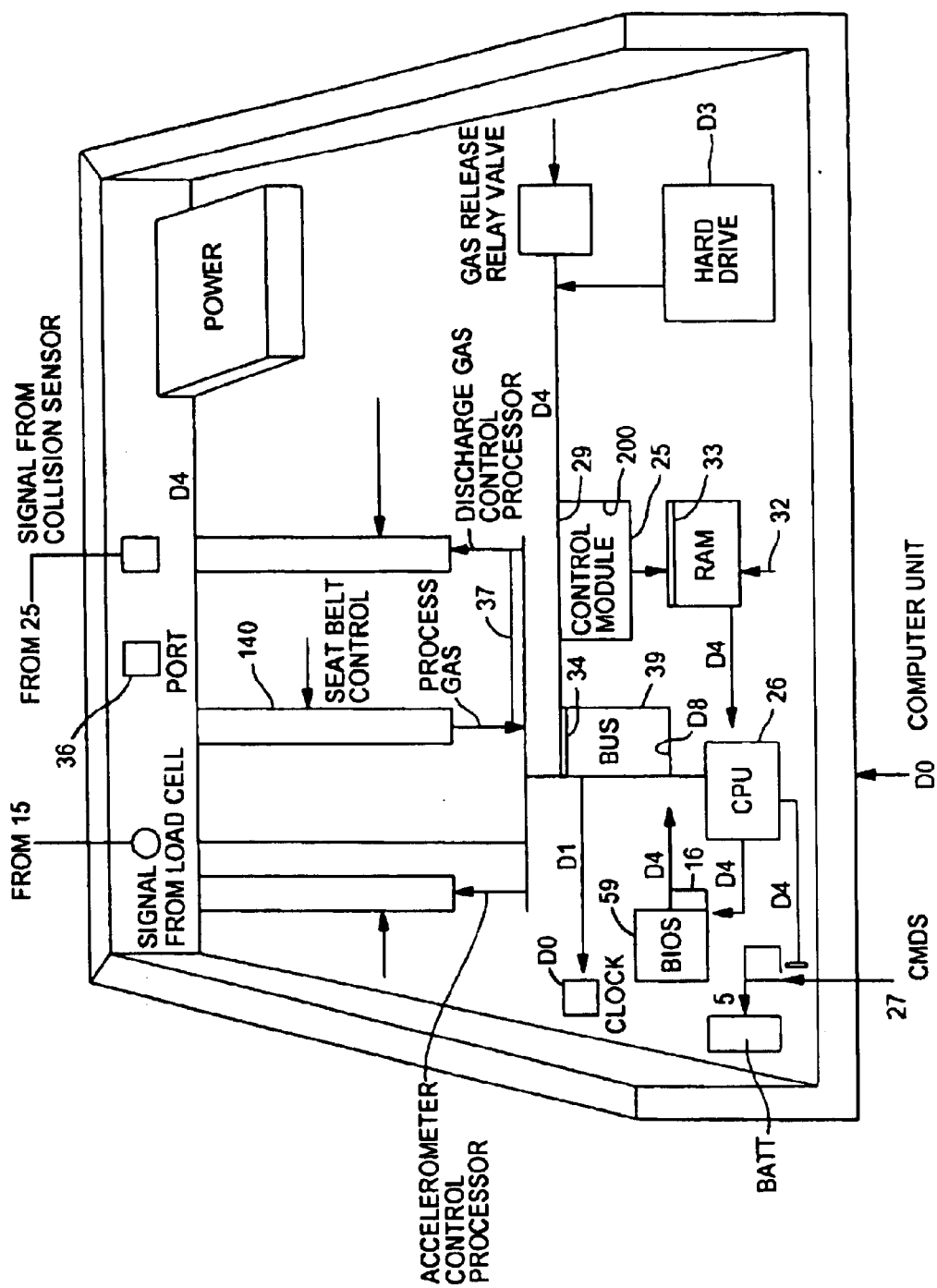
FIG. 1 is seen to represent a computer system (00) with its internal elements that enablers signal communication.
Figure 2:
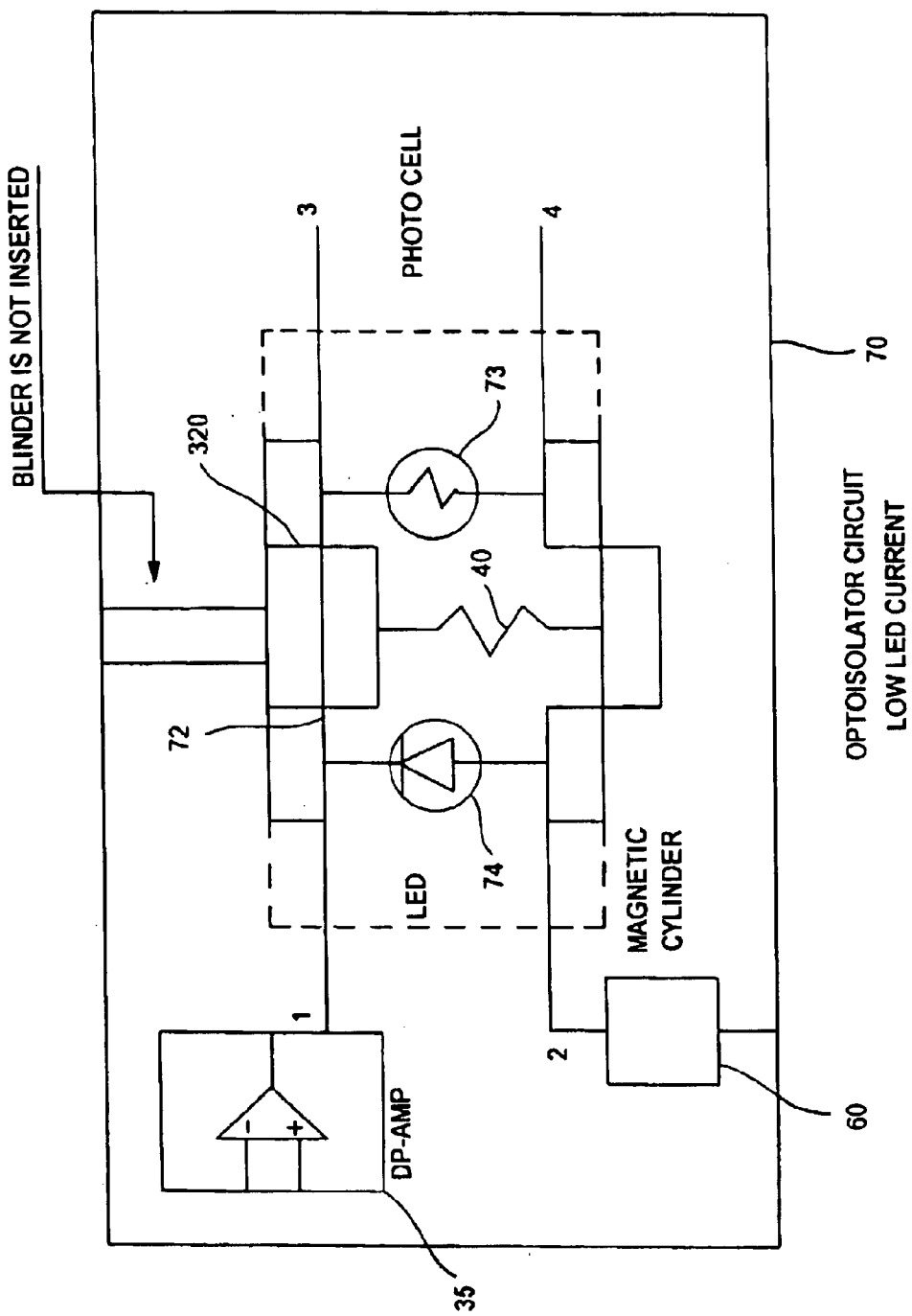
FIG. 2 is seen to represent the optoisolator circuit (70), a blinder (320) not inserted an op-amp (35), the LED (74), the photo cell (73) and the magnetic cylinder (60) for monitoring and enabling a permanent lock on die belt ends when the vehicle is in motion.
Figure 3:
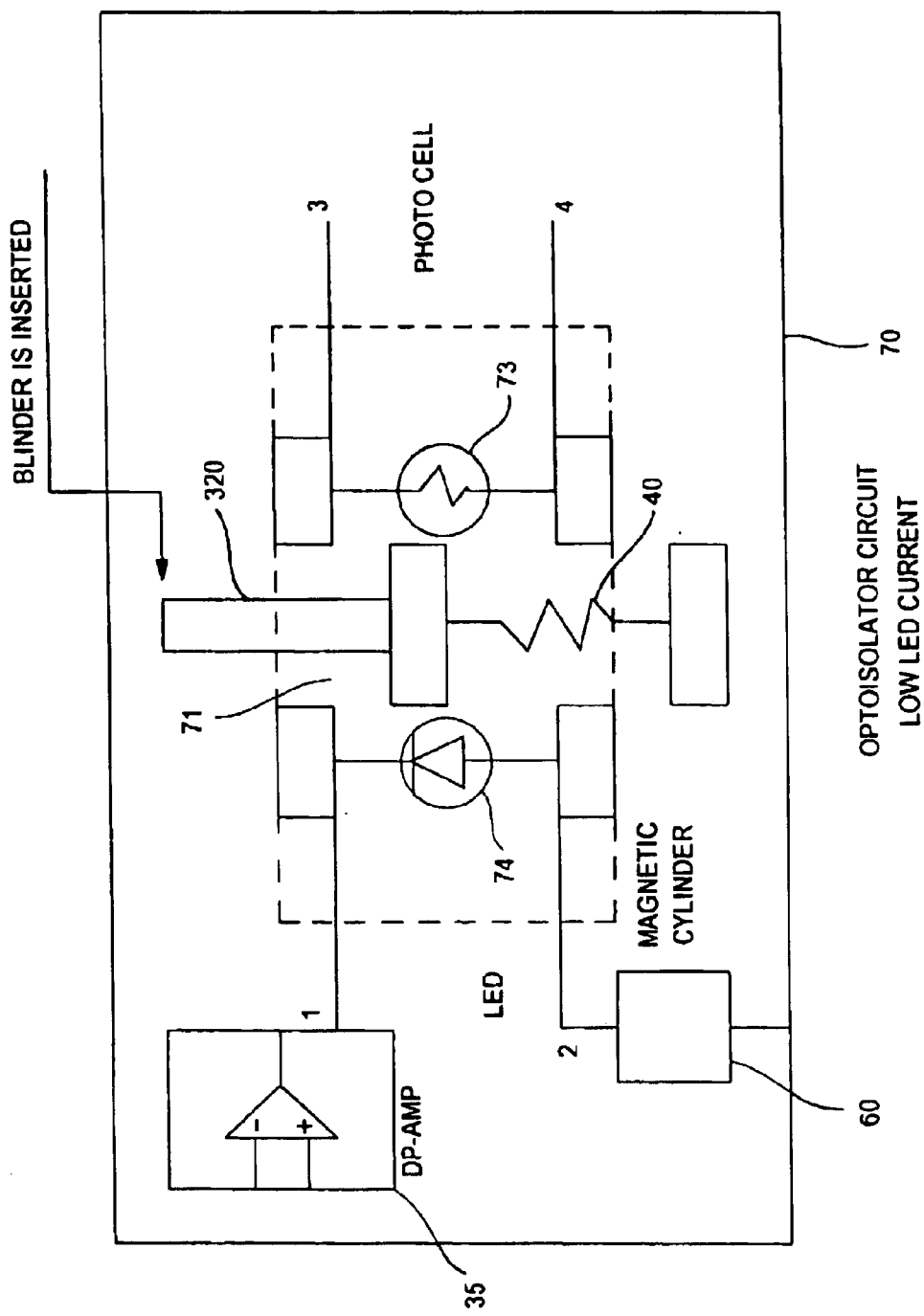
FIG. 3 is seen to represent the optoisolator circuit (70), a blinder (320) inserted, an op-amp (35), the LED (74), the photo cell (73) and the magnetic cylinder (60) for monitoring and disabling a permanent lock on the belt ends when the vehicle is in motion.
Figure 4:
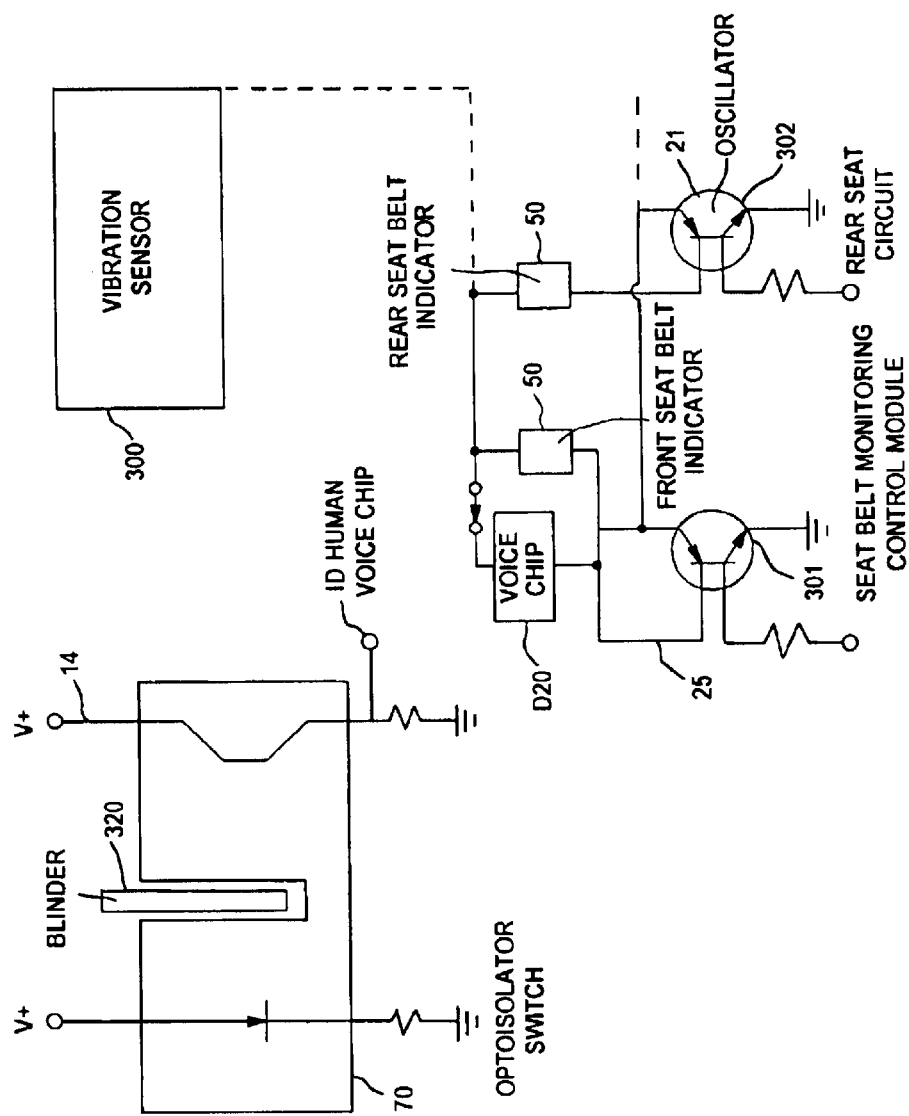
FIG. 4 shows the seat belt monitoring control module (25) shoeing the front and rear seats circuits, the human voice chip (020), vibration sensor (300), the optoisolator circuit (70).
Figure 5:
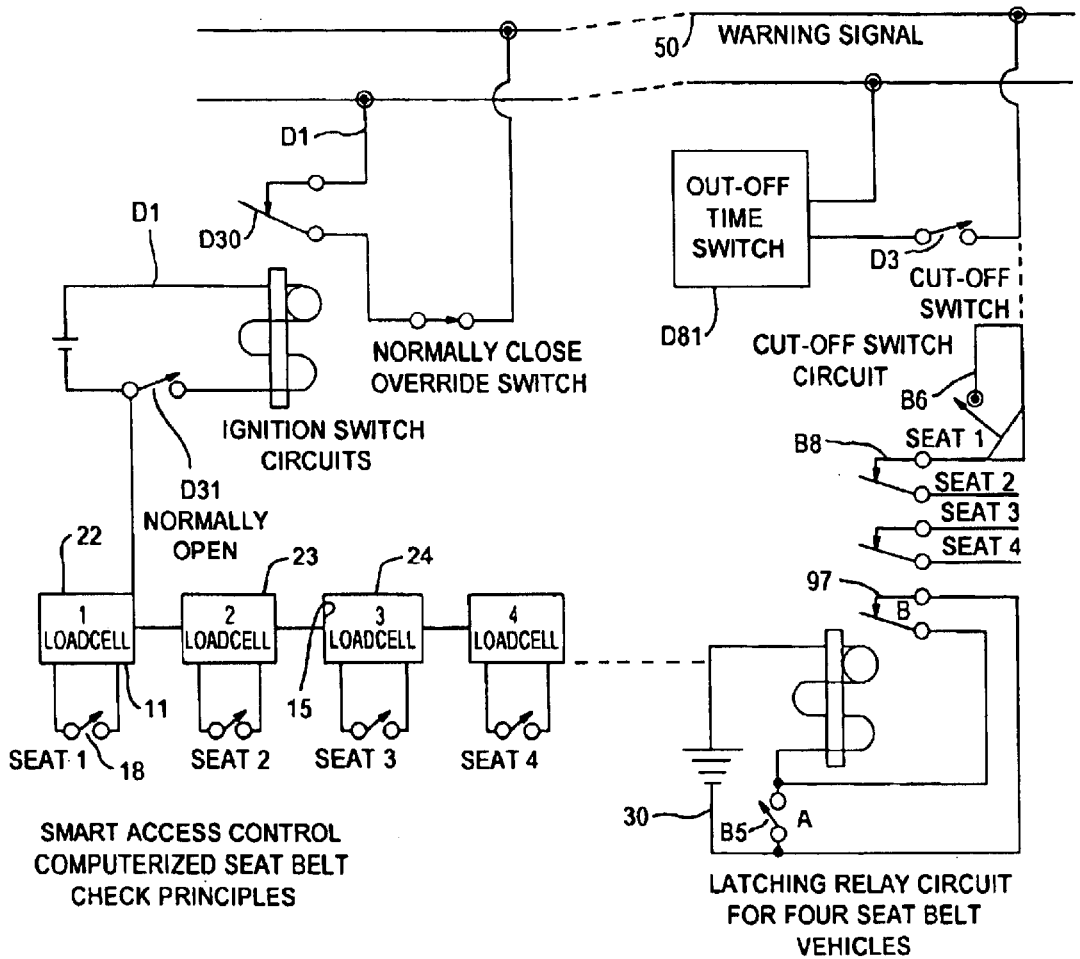
FIG. 5 is seen to represent the load cells (15), the switches (13) and a second switch (88), the ignition switch (01), the cut-off switch (03), the seat belt latching relay (80) with points A and B as they are related to the control of the seat belts.
Figure 6:
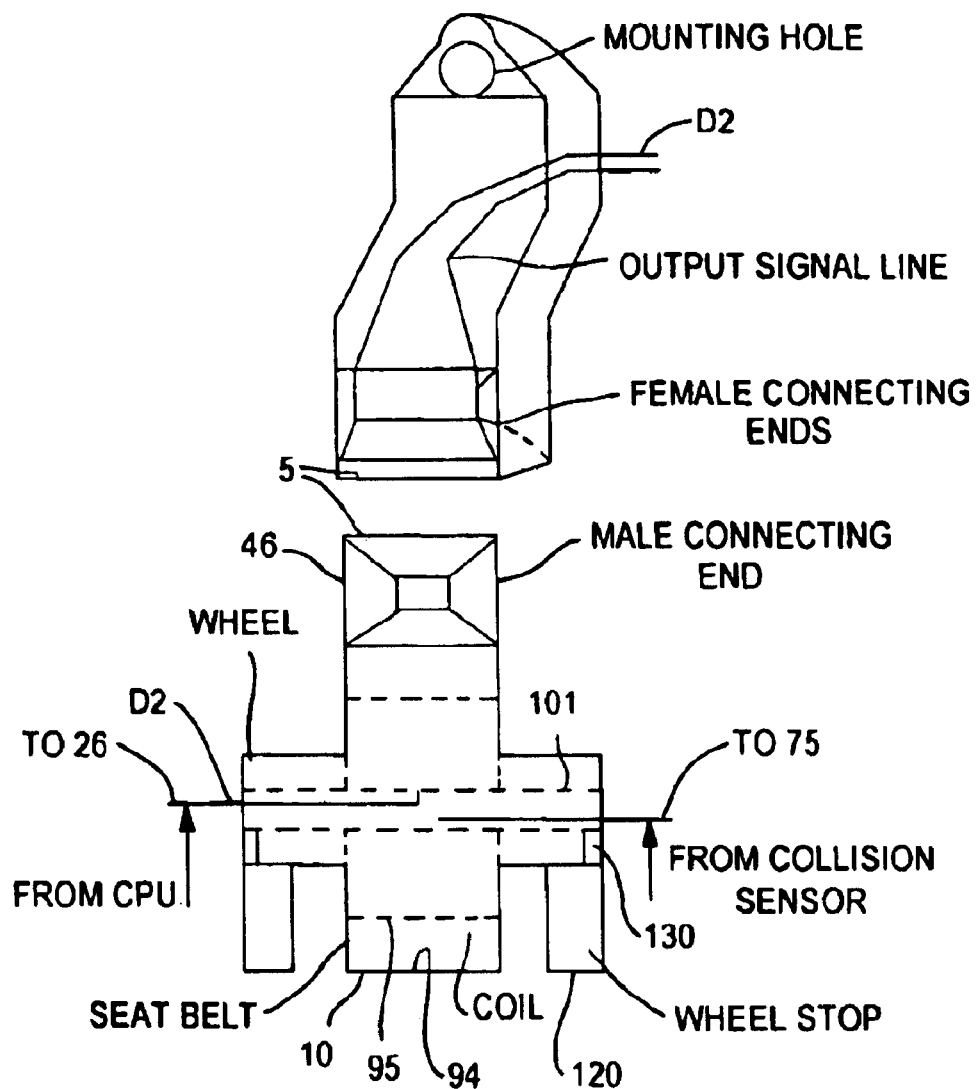
FIG. 6 is seen to represent the seat belt ends (46), the wheel (120), the moveable coil (95), all seen to interface with the optoisolator (70) and the control module (25)
Figure 7:
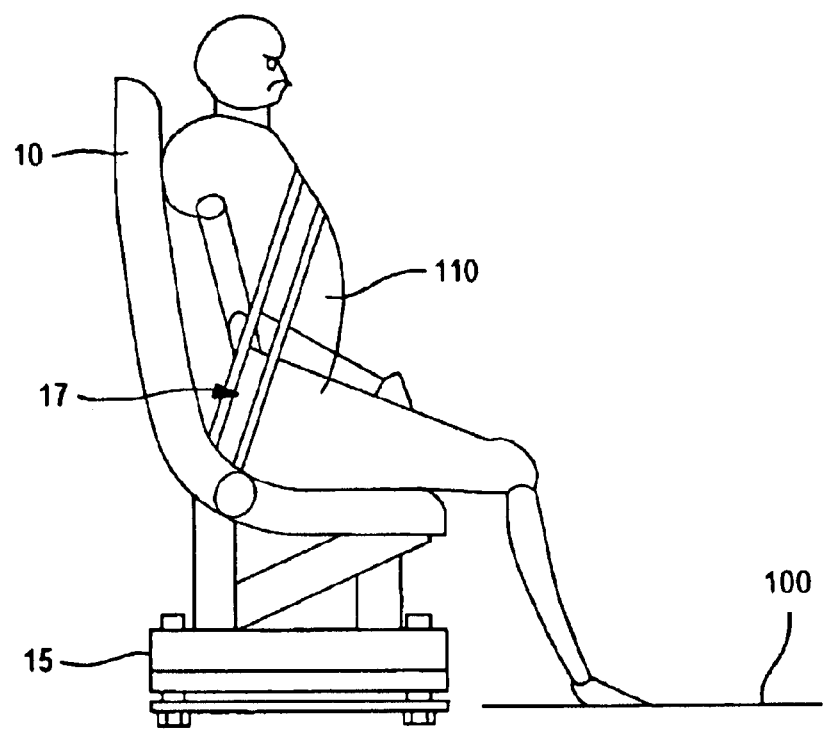
FIG. 7 is seen to represent a side view of a occupant (110) on a seat (10) of a vehicle using plurality of load cells (15) mounted between the seat mounting surface and the floor of the vehicle to control deployment of the supplemental restraint system of the present invention.
Figure 8:
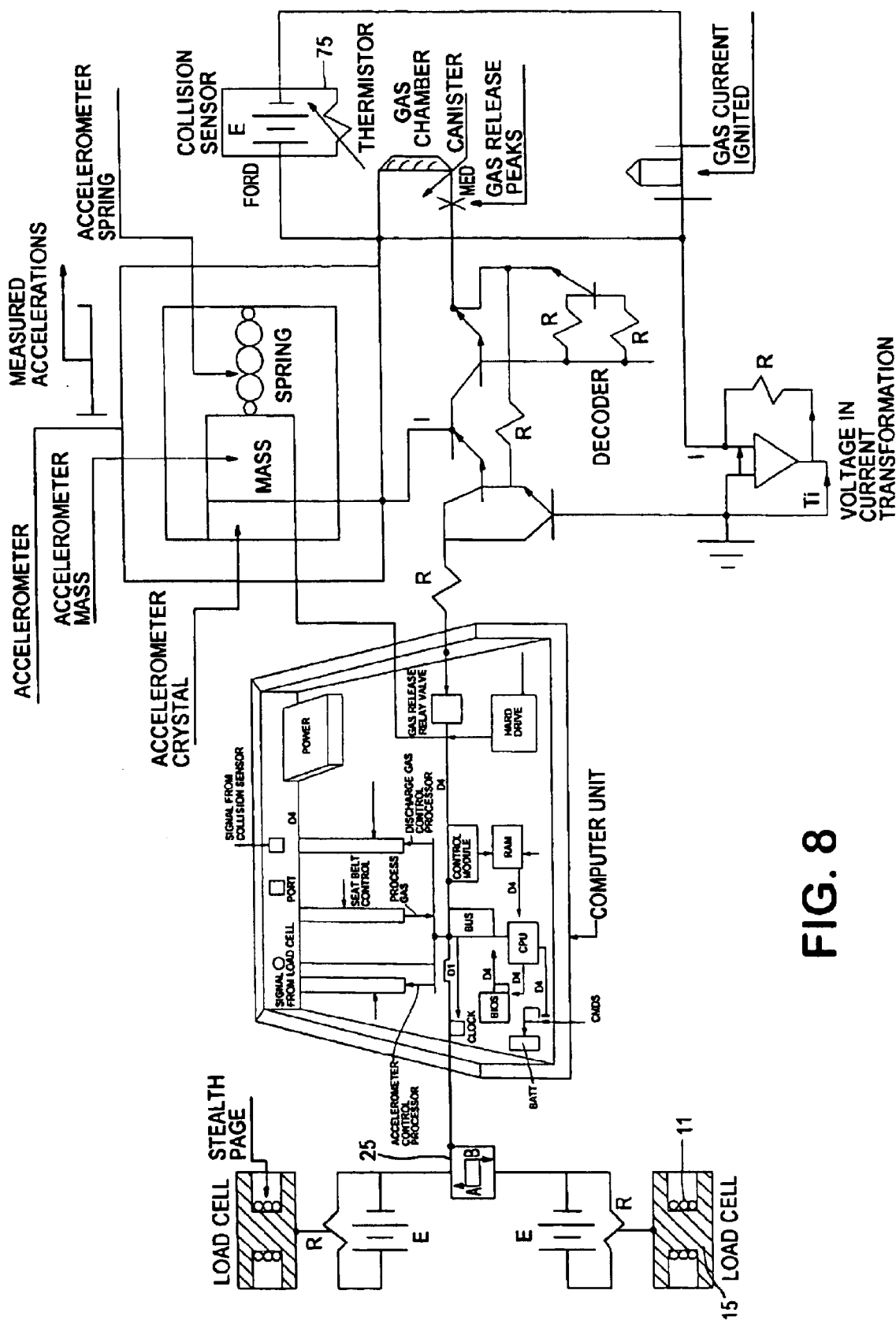
FIG. 8 is seen to represent a sectional view of the load cell (15) showing the strain gages (11), and a circuit diagram of other components of the present invention.

The preferred embodiment of the present invention includes the known standard configuration of the occupant's seat belt (10). Plurality of load cells (15) may be used to properly measure the occupant's precise and accurate weight for the accurate adjustment of the tensioning coil (95). The present invention generally comprises the known standard configuration of an occupant (110) and drivers side seat belts (10), all configured in the same manner. When the ignition switch is turn on, electrical current of 5 milivolt will energize the load cell (15) before the current reaches the computer system (00). When the occupant (110) takes on any of the seats (10), the load cell (15) will use the input energy from the occupant's body to start strings of events that will be sent to the computer device memory (32) to enable data processing and computation. The post (36) inside the computer will then check all the hardware components functionality to ensure that the hardware components and the CPU (26) are functioning properly. The post (36) Will later send signals over specific paths on the chip motherboard (38) to the load cell (15) to account for the weight signals or responses, to determine the occupant's actual weight value. The input energy from the occupant's body when seated is received as force energy.

The load cell (15) will then output the force energy as weight and send to the control module (25), and the oscillator (21) will oscillate, indicative of signal received enabling the control module to identify the seat (10) that has the occupant (110), before the motherboard (38) is enabled. The control module distinguishes front seat occupants from rear seat occupants through the front seat circuit (301) and the rear seat circuit (302). The chip motherboard (38) is where all activities are sent for processing. The result of the post reading is then compared with, in the CMOS (27) to enable accurate and timely responses to signal communication. At the completion of the post (36) readings, the boot program (08) will then check to see if there is any occupant (110) on any of the seat (10). This program will then send the occupant's information on weight to the address line (33) to avoid interference from vibrations and lightening current or thunderstorm. The CMOS is a memory where all P.C and hard drive configuration are stored, and also keeps track of the time and date of every information stored for the control of the smart seatbelt system.

When the ignition switch (01) is turned on, all the other accessories inside the vehicle will be energized, but the engine will not crank. The post (36) will check the hardware (09) functionality to ensure that the hardware components and the CPU (26) are functioning properly. The post (36) will then send signals over specific paths on the motherboard (38) to the load cell (15) to check for the presence of the occupants (110) on all the occupied seats (10). The chip motherboard (38), which is where all the occupant's activities are sent for processing, will enable the occupant's information from the post (36) be compared with in the CMOS before processing. After all signals are processed, the boot program (08) will send the occupant's information to the address line (33) for safety storage. At this time the ignition circuit (01) will be open until the driver takes seat 1 (22), which is the driver's seat. When the driver takes the driver's seat (22), the strain gages (11), of the load cell (15), will provide electrical responses from the applied bending, stretching, or compressing of the strain gage (11). These electrical responses will then energize the other load cells (15), the computer (00), and also close the switch on seat (22). By closing the circuit on seat 1 (22), the ignition switch circuit will then be energized so that the engine would be started. The presence of an occupant will energize the load cell (15). The load cell (15) will then energize all the other switches (18), after the presence of the occupant (110) is noticed. The switch (18) will then turn on the optoisolator switch (70) that will then energize the latching relay (80) to ensure that all the occupants are belted. If any of the occupant (110) is not belted, the isolator switch will then send a "1" for signal communication to the seat belt processor (140) to enable the control module (25) energize the human voice chip (020) to then warn of the unbelted occupant (110). If the occupant (110) is still not belted, the cutoff switch (03) will then be enabled to shut off the engine after 5 seconds time lapses. The counter (50) will stay operative with the latching relay (80) and the optoisolation switch (70) to check out all the other seats by tracking the number of occupants (10) that are present. The Spring Control (20) for the Isolator Switch will then deploy a spring carrying current (40) that monitors the contacts of each seat belt connectors (5). When the current is restricted or cutoff, the spring will retract to unlock the seat belt connectors inside the open fixed end of the seat belt housing. The seatbelt indicator or counter (50), by monitoring the other load cells (15), and the seat belt circuits behaviors, will signal the seat belt processor (140) when any of the occupied seats (10) is found unbelted. The seat belt processor (140) will then energize the control module (25) that will activate a human voice chip (020) for response, to warn of the unbelted occupied seat number. When the ignition switch (01) is closed, the control module (25) is energized. The cutoff switch circuit (03) will then be closed to allow the control module (25) in the energized state. When any occupant (110) is not wearing the seat belt (17), the counter circuit (50), and the latching circuit (80) will close for that seat location, enabling the blinder (320) to disengage, allowing the cutoff switch (03) to stay opened for the engine to shut off. When the vehicle rolls over in a roll over type accidents, the vibration sensor (300) will sense the roll over activities and activate the cutoff switch (03). The cutoff switch (03) will then shut off the engine after enabling the tensional moveable coil (95) to motion the seatbelt (17) to hold the occupant secured on the seat (10) prior to the flip. The vibration sensor (300) and all other initial sensors are programmed to respond to a delay, where for each delayed time the cutoff switch (03) will kick in at the end of the delayed intervals.

The time switch or timing circuit (001), which is connected in parallel with the control module (25), enables the cutoff switch (03) to respond to the cutoff signal faster. While the power line transient (310) ensures the protection of any failure that may occur within the computer and the electronics due to external voltages. The power line transients (310) filter out lightening effects or transient phenomenon from the computerized or electronic system so that the precise and accurate transmission of the occupants weight information is guaranteed. When an occupant (110) seats on any of the seats (17), the load cell switch (18) will close, allowing the load cell output energy to energize the control module (25). The control module (25), after receiving signal communication from any of the load cells (15), will enable the counter (50) to count the number of closed load cell switches (18). Said control module (25) will enable the optoisolator switch (70), that will then energize the latching relay (80) to then check for the seat belt latching of the occupied seats (10) with closed load cell switches (18) to assure occupants safety. When switch (18) for the occupied seat (10) is closed, the latching relay (80) circuit will also be energized so that the seat belt (17) for the occupied seat location is checked for buckling. The latching relay (80) circuit and the counter (50) circuit are closed only when an occupant (110) takes any of the seats (10). The latching relay switch (85) is only energized when the counter circuit (50) is closed. The energizing of the latching relay (80) is momentary, and each time the latching relay (80) is energized, switch "A" is closed. Once the latching relay (80) is energized, contacts "B" will close, holding the latching relay (80) in the energized state after switch "A" is opened. All the other contacts (87) will follow the same sequence of operation. The seat belt (17) and the latching relay (80) are arranged so that the contacts of seat 1 (22), which is the driver's seat, will supply power to the coils of seat 2 (23), seat 3 (24), and seat 4 (25). The entire computerized system is programmed to recognize pattern of switches (88), and occupants will not be able to start the vehicle if the said occupant is seating on any seat (10) other than the driver's seat (22). The smart seat belt control system's technology will protect occupants of all sizes. The same uniqueness of this state of the art invention does not allow any interference to exist between the insertion of the ignition key and the ignition switch (01). The present invention rather prevents occupants (110) from unlatching the seat belt (17 once the engine is running. The device also gives every occupant a total protection with the uniqueness of the advanced weight responsive supplemental restraint computer system.

Other devices may be used in place of the load cell, like a pressurized or inflatable bag that would be mounted on the surface of the seat or beneath the seat. When an occupant takes the seat, the occupant's weight will displace x-amount of the stored pressure to a relay that will record the displacement as weight. The stored pressure is the maximum pressure to support the weight value of the said maximum. The weight of the replacing occupant will displace the stored pressure to the amount equal to the said occupant's weight value. If the weight of the occupant exceeds or equal the stored value, then the tensional force on the seat belt against the occupant will have a constant value. The recorded displacement will then be transformed into a weight value unit that the CPU will recognize. The CPU will then carry on the computation and calculation the same way like the load cell. Every process is the same when comparing the pressurized bag operation with the load cell operation. Therefore, for more accurate readings of the occupant's weight, only the load cell will be described in the entire description. However, the applicant is claiming the use of any bag, for the purpose of trying to adopt said bag to control the operation of the seat belt.

The load cells (15) are mounted underneath the seat (10) and bolted between the mounting metal base of the seats (10), and the floor (100) of the vehicle. Said mounting location of the load cells provide a solid support and attaching structural strength, while maintaining precise and accurate loading of the occupant's weight on the said load cells. The load cell (15) ascertains the weight of the passenger's seat (10), and any occupants' (110) therein. The load cell (15) can also be calibrated so that the weight of the seat (10) is the zero point reading.

Mounting the load cell (15) between the mounting metal base of the seat (10) and the floor (100) of the vehicle, or on rigid sliding or fixed surfaces, rather than within the passenger's seat (10), the present invention is more likely to obtain an accurate computation of the passengers weight. Said weight is not subjected to any faulty readings due to the nature and configuration of the cushioning (12) between the thickness of the contact seating surfaces (13) of the passenger's seat (10) and the occupant (110) movement. The load cell (15) weighing system is a high accuracy scale with an in vehicle information system. The applicant also acknowledged the design of the high accuracy weighing system to carry in vehicle information about the occupant (110). Incorporating a ROM or BIOS memory (59), a RAM memory (32), and a software program inside the load cell (15), to record any and all the information about the changing occupant (110). The BIOS provides basic control over the load cell (15) and is stored in the ROM (59). The ROM (59), which is a special chip for the said computer device, contains instructions and information in its memory that is not changeable. Whereas the RAM (32), is a primary storage for the occupant's information. Accordingly, it will display and record in the memory (32), all the necessary computed weights and also feed the CPU (26) with these information to allow calculation of the tensional force and other necessary information needed to aid the control of a variable tensional force for the seat belt (17). The tensioning of the seat belts (17) generates a force, where such generated force, with the use of the present invention, or by incorporating the software program inside the load cell (15), is proportionate to the computed weight of the occupant (110) on the sensed seat (10). The software program enables signal communication with the driver and the occupant (110) if necessary, to properly protect the occupants (110) from an uncalled behavior when the vehicle is in motion. All the seat belts (17) in the vehicle are supported and controlled by the smart seat belt control system. All the information and data are stored in RAM (32) before the processor (140) can manipulate the data. All data in the computer (00) exist as 0s and 1s representation of the occupant's weight in binaries. An open switch represents a 0, while a closed switch represents a 1. When the key switch (01) is turned on, RAM (32) is a blank slate. The memories are filled with 0s and 1s that are read from the load cell output and transformed to the address line. When there is no occupant on the seat, every data in RAM (32) will disappear. The software (16), will recognize which data lines the pulses are coming from; and interprets each pulse as a 1. Any line on which a pulse is not sent is represented as a 0. The combination of 1s and 0s from eight data lines will form a byte of data. The RAM (32) functions as a collection of transistorized switches for the control room of this device intelligence. The 1s and 0s, which are ON and OFF switches, are used to control displays and also add numbers by representing the "0s" and the "1s" in the binary number system. This binary number system will allow the computer to do any other form of math. Everything in the computer (00), math's, words, numbers software instructions will communicate in the binary number system. That means all the switches (transistors) will do all types of manipulation to compute the accurate tensioning of the occupant. The clock inside the computer (00) will regulate how fast the said computer should work, or how fast the transistorized switches should open or close. The faster the clock ticks or emits pulses, the faster the computer will work. The speed is measured in gigahertz, which are some billions of ticks per second. Current passing through one transistor is used to control another transistor; in effect turning the switches on and off to change what the second transistor represents as a logic gate.

The load cell (15) which is corrosion resistant high alloy steel with a dynamic load cell capacity of up to 1000 lb or more, is constructed from machined high steel beams with strain gages (11) bonded inside. This load cell (15) is designed for vehicles with seat belts (17) or any restraint system like the air bags (1,2). The strain gages (11), which are electrical resistance elements, are properly sealed with sealant that will not allow moisture or any, contaminant to disrupt the strained information. When the occupant's body is input into the seat where the load cell (15) is bolted underneath, the load cell (15) will process the input information and the weight of the occupant (110) will be applied on the strain gages (11). The strain gages (11) will then be strained to the weight amount of the weight of the occupant (110), and the load cell (15) will output this amount as the occupant's weight. Accordingly, the weight of the occupant (110) will create a reaction force that will be acted upon, and applied on the passenger's seat (10).

These applied weights will enable the strain gages (11) to then be strained compressed, pressured, or stretched in a corresponding amount, causing a change in voltage signal, on the connecting lines. As the strain gages (11) are stressed strained, compressed or pressured, the effective resistance of the strain gages (11) will vary in an amount corresponding to the strains. The strain thereacross will vary in an amount corresponding to the actual weight of the occupant (110). Specifically, the induced voltage across each strain is divided so that a voltage signal is obtained that corresponds to the weight of the occupant (110) on the seat (10) where the gages are strained. The control module (25), which is a silicon control rectifier, will intelligently identify the seat (10) where the weight signal is outputting from, and manage the flow of the weighted data to the ROM (59). The ROM (59) will then receive the data about the occupant from the control module (25) and direct to the basic input and output system BIOS inside the ROM (59) program to the address line (33). The ROM (59) will then take the load cell (15) data about the occupant (110) from the address line (33) and turn over to the CPU (26) to manipulate. The CPU (26) uses the address line (33) to find and invoke the RAM (32) to insure an accurate calculation of the occupant's tensional force and any other information needed to feed the moveable coil (95), including deploying the air bag (1,2) when the impact force is determined. The coil (95), in the housing for the moveable end of the seat belt connector (5), is rotate-able. The coil (95) is winded on two shafts (101), that have wheels (120) at each end. The wheels (120) are rotated as the coils (95) receive collision signal from the collision sensor (75). A stopper plunger (130) is engaged between the wheels (120) when the coils (95) complete their windings, initiated by the energy from the seat belt processor (140). Said coils (95), will receive constant current I, as the ignition switch (01) is turn on. Upon receiving the weight signals in voltage reading E, from the load cells (15), said voltage reading will influence the number of rotations of the coil (95) that is needed to safely protect and tension the occupant (110), without causing any further injury to the said occupant.

The CPU (26) will calculate the occupant's tensional force value and send said information to the seat belt microprocessor (140) that will then use the said information from the CPU (26) to process and energize the moveable coil (95). The moveable coil (95) will then use the processed information from the CPU (26) and the standard 5 milivolts from the starting means to generate control energy for the occupant's tensional force value for seat belt control. Said control energy is proportionate to the load cell (15) output weight value of the occupant (110). The moveable coil (95), after receiving the 5 milivolts energy from the starting means and the information from the CPU (26), generates a tensional force energy on its windings that is proportionate to the occupant's weight and equal to the force needed to hold said occupant on the seat (10). The number of rotation of the moveable coil (95) determines the tensional force on the seat belt (17) against the occupant (110). When said occupant (110) is replaced, the EPROM (34) will control that information at the address line (33). The EPROM (34) deletes stored information about a replacing occupant each time said occupant is replaced. When a collision is sensed, the amplifier (20) will amplify the entire device for a more speedy output to the moveable coil (95). Empowering all signal operations of the processors (140) and control module (25) to enable other signal devices turning on and off different combinations of transistorized switch (04). The processor (140) will receive signals from the said transistorized switches (04), activating it to handle the arithmetic logic unit that enables all data manipulations. The arithmetic logic unit is connected to the RAM (32) through the computer motherboard (38) to allow logical manipulation of data. The motherboard (38) and the interface module (200) will then receive data and coded instructions from the computer RAM (32). Data will travel 10 bits at a time and the branch prediction unit will then inspect the instructions to decide on the logic unit. The decoder will then translate the response from the load cell (15) into the instructions that the arithmetic logic unit can handle. The ALU processes all its data from the electronic scratch pad or register that is secured on the motherboard (38). All results are made final at the RAM (32).

The control module (25) for the present invention, which is a silicon-controlled rectifier, receives pulses at the gate (29) from the load cells (15) to signal other devices. These pulses are currents that are transmitted to energize other devices, like the cutoff switch (03), to shut off the engine when an unbelted occupant (110) is detected. The silicon-controlled rectifier, which consists of electrical isolation for logical operations, monitors the seat belt latches (5).

When the seat belt (17) is latched, or the first voltage zero is received, the control module (25) will turn on the magnetic cylinder (60). When the first current zero is received or the ignition switch (03) turned off, the control module (25) will turn off the magnetic cylinder (60). The control module (25) picks signals from the seat belt processor (140) that communicates with the computer system, the seat number of the unbelted occupant. When the occupant (110) is belted, the control module (25) will receive that signal and activates the line of force or current flow that will draw the magnetic poles for the magnetic cylinder (60) together to keep the seat belts locked while the vehicle is in motion. The closing of the switch of seat 1 (22), will energize the ignition switch (03) circuit that will enable the engine to crank. The seat belt processor (140) energizes all the logically transistorized switches (04), so that responses are transmitted on time, while the latching relay circuit (80) will always check for the seat belt latch (05) and energize the control module (25). The other load cells are energized only when the driver is on the driver's seat (22). The computer system will read stored information about the occupant's presents and energize the optoisolator switch (70) each time the load cell (15) is enabled. When the occupant (110) latches the seat belt (17), the optoisolator switch (70) will then transmit the latching signal to the computer counter (50). The counter (50) will then signal the control module (50) and the first voltage zero will be received. The counter (50) will then check the number of occupants (110) that are present and compares that information with the number of seat belts (17) that are latched. If there is any difference, the latching relay switch (85) will close at switch A, and the control module (25) will then activate the human voice chip (020) response that will signal the driver about the unbelted situation. At the end of the human voice warning signal, the control module (25) will automatically energize the cutoff switch (03) that will shut off the engine until the said occupant is belted. That is, the processor (140) will process the counter (50) to energize the latching relay (80) once an occupant is sensed. If the occupant is not belted, the processor (140) will receive that signal from the latching relay and assign a "0" signal to the control module (25), which will then energize the cutoff switch (03). When the seat belt (17) is latched, the optoisolator switch (70) will send a "0" signal to the latching relay (80) to stop processing of the said seat (17). If the seat belt (17) is unlatched, the optoisolator switch (70) will send a "1" signal to the latching relay (80) and the latching relay will then send a "0" signal to the processor (140) to continue processing. The optoisolator switch (70) has a LED (74) that is connected to the output of the photocell (73) to suggest activation of the seat belt (17) and enables signal communication with the latching relay (80). When the seat belt (17) is latched, a phototransistor (73) and the LED (74) will face each other across the open slit (71), of the optoisolator switch (70). The optoisolator switch (70), is an optical coupler, and depends on the input of the LED (74), to optically be coupled to the photocell (73). When an occupant (110) is not belted, the LED (74) will be off, a "0" signal and the photocell (73) resistance will then be high. When the occupant (110) is belted, the LED (74) current will be on, a "1" signal, and the photocell (73) resistance will then be low. The interface module (200) for the photocell (73) will measure the light intensity inside the optoisolator (70) for all two faces of the photocell and allow activation of the op-amp (35). The op-amp (35), which is a signal interface between the photocell (73) and the latching relay (80), will then amplifies the latching relay (80), to compare the buckling signal and the unbuckling signal at the LED (74). The photocell (73), which is a sensor or a transducer, will then converts the light or optical energy into electrical energy to further monitor the motion of the seat belt (17). When the occupant (110) is not belted, the light intensity will drop below the specified level. The optoisolator circuit (70) will monitor the light intensity inside the fixed end of the seat belt (17) and switches on the LED (74) when the said occupant (110) is not belted. The conductivity or resistance at the photocell (73) inside the optoisolator (70) will then change under this light exposure, which is initiated from the load cell switch (18), when closed. When the occupant (110) is belted, the resistance will decrease while the light intensity will increase. The increase in the light intensity will then energize the counter (50) and the latching relay (80), enabling the interface module (200) to then generate an output voltage that is proportionate to this light intensity. The output voltage from the interface module (200) will always be proportionate to the load cell output voltage for the identified seats. Said output voltage is the absolute weight of the occupant (110) on the seat (10). The changeable voltage is what is then used to energize the moveable coils (95) of the seat belt tensioner to enable variable tensioning effect on the occupant (110), so that an accurate and proportionate tensioning force is assured when the vehicle is involve in an accident.

The generated voltage from the load cell's output is inversely proportionate to the resistance therein. Accordingly, if the signal is "0," the latching relay (80) will transmit a signal to the seat belt processor (140), enabling the processor (140) to signal the control module (25). The control module (25), after receiving said signal, will activate the human voice chip (020) for a response to the driver, addressing the seat number and the unlatched behavior of the occupant (110). If the occupant (110) is still not belted, then the control module will activate the cutoff switch (03) that will then be energized through the coded insulated cable (02). The insulated cable (02) could be of two wire system to read the "0s" and the "1s." When the driver's seat belt (17) is latched, the optoisolator switch (70) will activate the counter (50). The counter (50) will then signal the seat belt processor (140) to process other switches (18) and also check for the other seat belt latching When the counter (50) picks signal communication from the other load cells (15), the other switches (85) will be energized to carry on various assigned tasks. The voice chip (020), which is incorporated in the control module (25), warns of the unbelted occupant (110) when detected. This voice chip (020), is the first output to the driver when an occupant (110) is detected for not wearing the seat belt (17). The output from the counter (50) will energize the input to the latching relay (80) and open switch A at the end of each count, to enable the other seat switches (85) for the latching relay to be processed. The processor (140) being in signal communication with the counter (50), will pick the seat number of the occupant (110) that is not belted and feed the human voice chip (020) for responses. When the seat belt (17) is latched, the arrangement of the electrically conducting wires for the optoisolator circuit (70), to the magnetic cylinder (60), will initiate a lock at the contact points of the seat belt connectors when closed. This lock is for preventing occupants (110) from disconnecting the seat belt (17) when the vehicle is in motion. When the seat belts (17) are connected, the metal connectors (46) on the mobile end of the seat belt (17) will trigger the circuit for the magnetic cylinder (60), that will keep both ends locked while the vehicle is in motion. The input voltage (14), for the optoisolator circuit (70), will decide the opposition to the flow of current. Said optoisolator (70) will also monitor and compare this flow to the resultant current that leaves the circuit to achieve the impedance matching for each seat. This impedance matching will help the occupant seating position counter (50), to assist the seat belt processor (140) in knowing the number of occupants (110) that are in the vehicle and to identify the seat location for the said unbelted occupant (110). The counter (50) will also check the operation of any other devices and switches. If any malfunction switch is detected, the voice chip (50) will activates a user-defined message to the driver for possible follow ups and repairs. Signals are transmitted in digital and amplified by the op-amp (35) to timely speed up responses. The tensioning of the seat belt (17) and the airbag deployment force are controlled by the occupant's presents and their body weight. The table below shows occupants weight values in decimals as they are converted to binaries at a constant speed of 13 MPH that will enable deployment of the are bag and variably tensioning the occupants on their seats, while allowing the airbag to be more effective. The table also shows that kids and adult passengers are all protected in the present invention. The binaries represent "ON" and "OFF" switches in "0s" and "1s".

| WEIGHT IN DECIMALS | WEIGHT IN BINARIES "off & on switches" | SPEED "minimum speed for deployment" |
| --- | --- | --- |
| 1 | 1 | 13 MPH |
| 2 | 10 | 13 MPH |
| 3 | 11 | 13 MPH |
| 4 | 100 | 13 MPH |
| 5 | 101 | 13 MPH |
| 6 | 110 | 13 MPH |
| 7 | 111 | 13 MPH |
| 8 | 1000 | 13 MPH |
| 9 | 1001 | 13 MPH |
| 10 | 1010 | 13 MPH |
| 11 | 1011 | 13 MPH |
| 12 | 1100 | 13 MPH |
| 13 | 1101 | 13 MPH |
| 14 | 1110 | 13 MPH |
| 15 | 1111 | 13 MPH |
| 16 | 10000 | 13 MPH |
| 17 | 10001 | 13 MPH |
| 18 | 10010 | 13 MPH |
| 19 | 10011 | 13 MPH |
| 20 | 10100 | 13 MPH |
| 21 | 10101 | 13 MPH |
| 22 | 10110 | 13 MPH |
| 23 | 10111 | 13 MPH |
| 24 | 11000 | 13 MPH |
| 25 | 11001 | 13 MPH |
| 26 | 11010 | 13 MPH |
| 27 | 11011 | 13 MPH |
| 28 | 11100 | 13 MPH |
| 29 | 11101 | 13 MPH |
| 30 | 11110 | 13 MPH |
| 31 | 11111 | 13 MPH |
| 32 | 100000 | 13 MPH |
| 33 | 100001 | 13 MPH |
| 34 | 100010 | 13 MPH |
| 35 | 100011 | 13 MPH |
| 36 | 100100 | 13 MPH |
| 37 | 100101 | 13 MPH |
| 38 | 100110 | 13 MPH |
| 39 | 100111 | 13 MPH |
| 40 | 101000 | 13 MPH |
| 41 | 101001 | 13 MPH |
| 42 | 101010 | 13 MPH |
| 43 | 101011 | 13 MPH |
| 44 | 101100 | 13 MPH |
| 45 | 101101 | 13 MPH |
| 46 | 101110 | 13 MPH |
| 47 | 101111 | 13 MPH |

-continued

| WEIGHT IN DECIMALS | WEIGHT IN BINARIES "off & on switches" | SPEED "minimum speed for deployment" |
| --- | --- | --- |
| 48 | 110000 | 13 MPH |
| 49 | 110001 | 13 MPH |
| 50 | 110010 | 13 MPH |
| 51 | 110011 | 13 MPH |
| 52 | 110100 | 13 MPH |
| 53 | 110101 | 13 MPH |
| 54 | 110110 | 13 MPH |
| 55 | 110111 | 13 MPH |
| 56 | 111000 | 13 MPH |
| 57 | 111001 | 13 MPH |
| 58 | 111010 | 13 MPH |
| 59 | 111011 | 13 MPH |
| 60 | 111100 | 13 MPH |
| 61 | 111101 | 13 MPH |
| 62 | 111110 | 13 MPH |
| 63 | 111111 | 13 MPH |
| 64 | 1000000 | 13 MPH |
| 65 | 1000001 | 13 MPH |
| 66 | 1000010 | 13 MPH |
| 67 | 1000011 | 13 MPH |
| 68 | 1000100 | 13 MPH |
| 69 | 1000101 | 13 MPH |
| 70 | 1000110 | 13 MPH |
| 71 | 1000111 | 13 MPH |
| 72 | 1001000 | 13 MPH |
| 73 | 1001001 | 13 MPH |
| 74 | 1001010 | 13 MPH |
| 75 | 1001011 | 13 MPH |
| 76 | 1001100 | 13 MPH |
| 77 | 1001101 | 13 MPH |
| 78 | 1001110 | 13 MPH |
| 79 | 1001111 | 13 MPH |
| 80 | 1010000 | 13 MPH |
| 81 | 1010001 | 13 MPH |
| 82 | 1010010 | 13 MPH |
| 83 | 1010011 | 13 MPH |
| 84 | 1010100 | 13 MPH |
| 85 | 1010101 | 13 MPH |
| 86 | 1010110 | 13 MPH |
| 87 | 1010111 | 13 MPH |
| 88 | 1011000 | 13 MPH |
| 89 | 1011001 | 13 MPH |
| 90 | 1011010 | 13 MPH |
| 91 | 1011011 | 13 MPH |
| 92 | 1011100 | 13 MPH |
| 93 | 1011101 | 13 MPH |
| 94 | 1011110 | 13 MPH |
| 95 | 1011111 | 13 MPH |
| 96 | 1100000 | 13 MPH |
| 97 | 1100001 | 13 MPH |
| 98 | 1100010 | 13 MPH |
| 99 | 1100011 | 13 MPH |
| 100 | 1100100 | 13 MPH |
| 101 | 1100101 | 13 MPH |
| 102 | 1100110 | 13 MPH |
| 103 | 1100111 | 13 MPH |
| 104 | 1101000 | 13 MPH |
| 105 | 1101001 | 13 MPH |
| 106 | 1101010 | 13 MPH |
| 107 | 1101011 | 13 MPH |
| 108 | 1101100 | 13 MPH |
| 109 | 1101101 | 13 MPH |
| 110 | 1101110 | 13 MPH |
| 111 | 1101111 | 13 MPH |
| 112 | 1110000 | 13 MPH |
| 113 | 1110001 | 13 MPH |
| 114 | 1110010 | 13 MPH |
| 115 | 1110011 | 13 MPH |
| 116 | 1110100 | 13 MPH |
| 117 | 1110101 | 13 MPH |
| 118 | 1110110 | 13 MPH |
| 119 | 1110111 | 13 MPH |
| 120 | 1111000 | 13 MPH |
| 121 | 1111001 | 13 MPH |
| 122 | 1111010 | 13 MPH |
| 123 | 1111011 | 13 MPH |
| 124 | 1111100 | 13 MPH |
| 125 | 1111101 | 13 MPH |
| 126 | 1111110 | 13 MPH |
| 127 | 1111111 | 13 MPH |
| 128 | 10000000 | 13 MPH |
| 129 | 10000001 | 13 MPH |
| 130 | 10000010 | 13 MPH |
| 131 | 10000011 | 13 MPH |
| 132 | 10000100 | 13 MPH |
| 133 | 10000101 | 13 MPH |
| 134 | 10000110 | 13 MPH |
| 135 | 10000111 | 13 MPH |
| 136 | 10001000 | 13 MPH |
| 137 | 10001001 | 13 MPH |
| 138 | 10001010 | 13 MPH |
| 139 | 10001011 | 13 MPH |
| 140 | 10001100 | 13 MPH |
| 141 | 10001101 | 13 MPH |
| 142 | 10001110 | 13 MPH |
| 143 | 10001111 | 13 MPH |
| 144 | 10010000 | 13 MPH |
| 145 | 10010001 | 13 MPH |
| 146 | 10010010 | 13 MPH |
| 147 | 10010011 | 13 MPH |
| 148 | 10010100 | 13 MPH |
| 149 | 10010101 | 13 MPH |
| 150 | 10010110 | 13 MPH |
| 151 | 10010111 | 13 MPH |
| 152 | 10011000 | 13 MPH |
| 153 | 10011001 | 13 MPH |
| 154 | 10011010 | 13 MPH |
| 155 | 10011011 | 13 MPH |
| 156 | 10011100 | 13 MPH |
| 157 | 10011101 | 13 MPH |
| 158 | 10011110 | 13 MPH |
| 159 | 10011111 | 13 MPH |
| 160 | 10100000 | 13 MPH |
| 161 | 10100001 | 13 MPH |
| 162 | 10100010 | 13 MPH |
| 163 | 10100011 | 13 MPH |
| 164 | 10100100 | 13 MPH |
| 165 | 10100101 | 13 MPH |
| 166 | 10100110 | 13 MPH |
| 167 | 10100111 | 13 MPH |
| 168 | 10101000 | 13 MPH |
| 169 | 10101001 | 13 MPH |
| 170 | 10101010 | 13 MPH |
| 171 | 10101011 | 13 MPH |
| 172 | 10101100 | 13 MPH |
| 173 | 10101101 | 13 MPH |
| 174 | 10101110 | 13 MPH |
| 175 | 10101111 | 13 MPH |
| 176 | 10110000 | 13 MPH |
| 177 | 10110001 | 13 MPH |
| 178 | 10110010 | 13 MPH |
| 179 | 10110011 | 13 MPH |
| 180 | 10110100 | 13 MPH |
| 181 | 10110101 | 13 MPH |
| 182 | 10110110 | 13 MPH |
| 183 | 10110111 | 13 MPH |
| 184 | 10111000 | 13 MPH |
| 185 | 10111001 | 13 MPH |
| 186 | 10111010 | 13 MPH |
| 187 | 10111011 | 13 MPH |
| 188 | 10111100 | 13 MPH |
| 189 | 10111101 | 13 MPH |
| 190 | 10111110 | 13 MPH |
| 191 | 10111111 | 13 MPH |
| 192 | 11000000 | 13 MPH |
| 193 | 11000001 | 13 MPH |
| 194 | 11000010 | 13 MPH |
| 195 | 11000011 | 13 MPH |
| 196 | 11000100 | 13 MPH |
| 197 | 11000101 | 13 MPH |

-continued

| WEIGHT IN DECIMALS | WEIGHT IN BINARIES "off & on switches" | SPEED "minimum speed for deployment" |
|---|---|---|
| 198 | 11000110 | 13 MPH |
| 199 | 11000111 | 13 MPH |
| 200 | 11001000 | 13 MPH |
| 201 | 11001001 | 13 MPH |
| 202 | 11001010 | 13 MPH |
| 203 | 11001011 | 13 MPH |
| 204 | 11001100 | 13 MPH |
| 205 | 11001101 | 13 MPH |
| 206 | 11001110 | 13 MPH |
| 207 | 11001111 | 13 MPH |
| 208 | 11010000 | 13 MPH |
| 209 | 11010001 | 13 MPH |
| 210 | 11010010 | 13 MPH |
| 211 | 11010011 | 13 MPH |
| 212 | 11010100 | 13 MPH |
| 213 | 11010101 | 13 MPH |
| 214 | 11010110 | 13 MPH |
| 215 | 11010111 | 13 MPH |
| 216 | 11011000 | 13 MPH |
| 217 | 11011001 | 13 MPH |
| 218 | 11011010 | 13 MPH |
| 219 | 11011011 | 13 MPH |
| 220 | 11011100 | 13 MPH |
| 221 | 11011101 | 13 MPH |
| 222 | 11011110 | 13 MPH |
| 223 | 11011111 | 13 MPH |
| 224 | 11100000 | 13 MPH |
| 225 | 11100001 | 13 MPH |
| 226 | 11100010 | 13 MPH |
| 227 | 11100011 | 13 MPH |
| 228 | 11100100 | 13 MPH |
| 229 | 11100101 | 13 MPH |
| 230 | 11100110 | 13 MPH |
| 231 | 11100111 | 13 MPH |
| 232 | 11101000 | 13 MPH |
| 233 | 11101001 | 13 MPH |
| 234 | 11101010 | 13 MPH |
| 235 | 11101011 | 13 MPH |
| 236 | 11101100 | 13 MPH |
| 237 | 11101101 | 13 MPH |
| 238 | 11101110 | 13 MPH |
| 239 | 11101111 | 13 MPH |
| 240 | 11110000 | 13 MPH |
| 241 | 11110001 | 13 MPH |
| 242 | 11110010 | 13 MPH |
| 243 | 11110011 | 13 MPH |
| 244 | 11110100 | 13 MPH |
| 245 | 11110101 | 13 MPH |
| 246 | 11110110 | 13 MPH |
| 247 | 11110111 | 13 MPH |
| 248 | 11111000 | 13 MPH |
| 249 | 11111001 | 13 MPH |
| 250 | 11111010 | 13 MPH |
| 251 | 11111011 | 13 MPH |
| 252 | 11111100 | 13 MPH |
| 253 | 11111101 | 13 MPH |
| 254 | 11111110 | 13 MPH |
| 255 | 11111111 | 13 MPH |
| 256 | 100000000 | 13 MPH |
| 257 | 100000001 | 13 MPH |
| 258 | 100000010 | 13 MPH |
| 259 | 100000011 | 13 MPH |
| 260 | 100000100 | 13 MPH |
| 261 | 100000101 | 13 MPH |
| 262 | 100000110 | 13 MPH |
| 263 | 100000111 | 13 MPH |
| 264 | 100001000 | 13 MPH |
| 265 | 100001001 | 13 MPH |
| 266 | 100001010 | 13 MPH |
| 267 | 100001011 | 13 MPH |
| 268 | 100001100 | 13 MPH |
| 269 | 100001101 | 13 MPH |
| 270 | 100001110 | 13 MPH |
| 271 | 100001111 | 13 MPH |
| 272 | 100010000 | 13 MPH |
| 273 | 100010001 | 13 MPH |
| 274 | 100010010 | 13 MPH |
| 275 | 100010011 | 13 MPH |
| 276 | 100010100 | 13 MPH |
| 277 | 100010101 | 13 MPH |
| 278 | 100010110 | 13 MPH |
| 279 | 100010111 | 13 MPH |
| 280 | 100011000 | 13 MPH |
| 281 | 100011001 | 13 MPH |
| 282 | 100011010 | 13 MPH |
| 283 | 100011011 | 13 MPH |
| 284 | 100011100 | 13 MPH |
| 285 | 100011101 | 13 MPH |
| 286 | 100011110 | 13 MPH |
| 287 | 100011111 | 13 MPH |
| 288 | 100100000 | 13 MPH |
| 289 | 100100001 | 13 MPH |
| 290 | 100100010 | 13 MPH |
| 291 | 100100011 | 13 MPH |
| 292 | 100100100 | 13 MPH |
| 293 | 100100101 | 13 MPH |
| 294 | 100100110 | 13 MPH |
| 295 | 100100111 | 13 MPH |
| 296 | 100101000 | 13 MPH |
| 297 | 100101001 | 13 MPH |
| 298 | 100101010 | 13 MPH |
| 299 | 100101011 | 13 MPH |
| 300 | 100101100 | 13 MPH |
| 301 | 100101101 | 13 MPH |
| 302 | 100101110 | 13 MPH |
| 303 | 100101111 | 13 MPH |
| 304 | 100110000 | 13 MPH |
| 305 | 100110001 | 13 MPH |
| 306 | 100110010 | 13 MPH |
| 307 | 100110011 | 13 MPH |
| 308 | 100110100 | 13 MPH |
| 309 | 100110101 | 13 MPH |
| 310 | 100110110 | 13 MPH |
| 311 | 100110111 | 13 MPH |
| 312 | 100111000 | 13 MPH |
| 313 | 100111001 | 13 MPH |
| 314 | 100111010 | 13 MPH |
| 315 | 100111011 | 13 MPH |
| 316 | 100111100 | 13 MPH |
| 317 | 100111101 | 13 MPH |
| 318 | 100111110 | 13 MPH |
| 319 | 100111111 | 13 MPH |
| 320 | 101000000 | 13 MPH |
| 321 | 101000001 | 13 MPH |
| 322 | 101000010 | 13 MPH |
| 323 | 101000011 | 13 MPH |
| 324 | 101000100 | 13 MPH |
| 325 | 101000101 | 13 MPH |
| 326 | 101000110 | 13 MPH |
| 327 | 101000111 | 13 MPH |
| 328 | 101001000 | 13 MPH |
| 329 | 101001001 | 13 MPH |
| 330 | 101001010 | 13 MPH |
| 331 | 101001011 | 13 MPH |
| 332 | 101001100 | 13 MPH |
| 333 | 101001101 | 13 MPH |
| 334 | 101001110 | 13 MPH |
| 335 | 101001111 | 13 MPH |
| 336 | 101010000 | 13 MPH |
| 337 | 101010001 | 13 MPH |
| 338 | 101010010 | 13 MPH |
| 339 | 101010011 | 13 MPH |
| 340 | 101010100 | 13 MPH |
| 341 | 101010101 | 13 MPH |
| 342 | 101010110 | 13 MPH |
| 343 | 101010111 | 13 MPH |
| 344 | 101011000 | 13 MPH |
| 345 | 101011001 | 13 MPH |
| 346 | 101011010 | 13 MPH |
| 347 | 101011011 | 13 MPH |

-continued

| WEIGHT IN DECIMALS | WEIGHT IN BINARIES "off & on switches" | SPEED "minimum speed for deployment" |
|---|---|---|
| 348 | 101011100 | 13 MPH |
| 349 | 101011101 | 13 MPH |
| 350 | 101011110 | 13 MPH |
| 351 | 101011111 | 13 MPH |
| 352 | 101100000 | 13 MPH |
| 353 | 101100001 | 13 MPH |
| 354 | 101100010 | 13 MPH |
| 355 | 101100011 | 13 MPH |
| 356 | 101100100 | 13 MPH |
| 357 | 101100101 | 13 MPH |
| 358 | 101100110 | 13 MPH |
| 359 | 101100111 | 13 MPH |
| 360 | 101101000 | 13 MPH |
| 361 | 101101001 | 13 MPH |
| 362 | 101101010 | 13 MPH |
| 363 | 101101011 | 13 MPH |
| 364 | 101101100 | 13 MPH |
| 365 | 101101101 | 13 MPH |
| 366 | 101101110 | 13 MPH |
| 367 | 101101111 | 13 MPH |
| 368 | 101110000 | 13 MPH |
| 369 | 101110001 | 13 MPH |
| 370 | 101110010 | 13 MPH |
| 371 | 101110011 | 13 MPH |
| 372 | 101110100 | 13 MPH |
| 373 | 101110101 | 13 MPH |
| 374 | 101110110 | 13 MPH |
| 375 | 101110111 | 13 MPH |
| 376 | 101111000 | 13 MPH |
| 377 | 101111001 | 13 MPH |
| 378 | 101111010 | 13 MPH |
| 379 | 101111011 | 13 MPH |
| 380 | 101111100 | 13 MPH |
| 381 | 101111101 | 13 MPH |
| 382 | 101111110 | 13 MPH |
| 383 | 101111111 | 13 MPH |
| 384 | 110000000 | 13 MPH |
| 385 | 110000001 | 13 MPH |
| 386 | 110000010 | 13 MPH |
| 387 | 110000011 | 13 MPH |
| 388 | 110000100 | 13 MPH |
| 389 | 110000101 | 13 MPH |
| 390 | 110000110 | 13 MPH |
| 391 | 110000111 | 13 MPH |
| 392 | 110001000 | 13 MPH |
| 393 | 110001001 | 13 MPH |
| 394 | 110001010 | 13 MPH |
| 395 | 110001011 | 13 MPH |
| 396 | 110001100 | 13 MPH |
| 397 | 110001101 | 13 MPH |
| 398 | 110001110 | 13 MPH |
| 399 | 110001111 | 13 MPH |
| 400 | 110010000 | 13 MPH |
| 401 | 110010001 | 13 MPH |
| 402 | 110010010 | 13 MPH |
| 403 | 110010011 | 13 MPH |
| 404 | 110010100 | 13 MPH |
| 405 | 110010101 | 13 MPH |
| 406 | 110010110 | 13 MPH |
| 407 | 110010111 | 13 MPH |
| 408 | 110011000 | 13 MPH |
| 409 | 110011001 | 13 MPH |
| 410 | 110011010 | 13 MPH |
| 411 | 110011011 | 13 MPH |
| 412 | 110011100 | 13 MPH |
| 413 | 110011101 | 13 MPH |
| 414 | 110011110 | 13 MPH |
| 415 | 110011111 | 13 MPH |
| 416 | 110100000 | 13 MPH |
| 417 | 110100001 | 13 MPH |
| 418 | 110100010 | 13 MPH |
| 419 | 110100011 | 13 MPH |
| 420 | 110100100 | 13 MPH |
| 421 | 110100101 | 13 MPH |
| 422 | 110100110 | 13 MPH |
| 423 | 110100111 | 13 MPH |
| 424 | 110101000 | 13 MPH |
| 425 | 110101001 | 13 MPH |
| 426 | 110101010 | 13 MPH |
| 427 | 110101011 | 13 MPH |
| 428 | 110101100 | 13 MPH |
| 429 | 110101101 | 13 MPH |
| 430 | 110101110 | 13 MPH |
| 431 | 110101111 | 13 MPH |
| 432 | 110110000 | 13 MPH |
| 433 | 110110001 | 13 MPH |
| 434 | 110110010 | 13 MPH |
| 435 | 110110011 | 13 MPH |
| 436 | 110110100 | 13 MPH |
| 437 | 110110101 | 13 MPH |
| 438 | 110110110 | 13 MPH |
| 439 | 110110111 | 13 MPH |
| 440 | 110111000 | 13 MPH |
| 441 | 110111001 | 13 MPH |
| 442 | 111000100 | 13 MPH |
| 443 | 110111011 | 13 MPH |
| 444 | 110111100 | 13 MPH |
| 445 | 110111101 | 13 MPH |
| 446 | 110111110 | 13 MPH |
| 447 | 110111111 | 13 MPH |
| 448 | 111000000 | 13 MPH |
| 449 | 111000001 | 13 MPH |
| 450 | 111000010 | 13 MPH |
| 451 | 111000011 | 13 MPH |
| 452 | 111000100 | 13 MPH |
| 453 | 111000101 | 13 MPH |
| 454 | 111000110 | 13 MPH |
| 455 | 111000111 | 13 MPH |
| 456 | 111001000 | 13 MPH |
| 457 | 111001001 | 13 MPH |
| 458 | 111001010 | 13 MPH |
| 459 | 111001011 | 13 MPH |
| 460 | 111001100 | 13 MPH |

The computerized switches as shown above to represent the occupant's weights, are computed from a weight range of one pound to a weight range of four hundred and sixty pounds. Each weight is programmed to turn on and off combinations of switches representing the occupants weight reaction to safeties and protections.

When the override switch (06) is pushed in, current will be restricted from flowing through the optoisolator switch (70). This restriction to current flow will allow the occupant (110) to unlatch the seat belt (17) when desired. However, with the closed circuit, current will run through the device of the present invention and the said seat belt (17) will stay locked. When the circuit is opened, the sensors will be in parallel until the occupant (110) latch the seat belt (17), enabling the circuit to then be closed. By closing the circuit for the override switch (06) will allow current to flow to the transistorized switches (04), and activates the control module (25) with a "1" signal so that the module (25), will discontinue signal communication to the cut off switch (03). The ignition switch (01) is arranged to ensure that, one set of contact for the said ignition switch (01), is assigned to each seat (10) in the vehicle. So that each time an occupant (110) takes any of the seats (10), one set of contact (030) will be closed for the air bag and the other set of contact (031) open for the seat belt (17). When the occupant (110) latches the seat belt (17), the contact for said seat belt (17) will then be closed, enabling the blinder (320) to set in the slit (72), allowing it to be a closed slit (72). The seat belt circuit to stay open is an indication that the occupant (110) is not belted and the unbelted behavior will prevent the driver from starting the vehicle. If the driver decides to get in the vehicle only to buckle up and start the vehicle, when the said driver leaves the vehicle idling, the engine will cutoff 5-minutes later.

The counter (50) will detect the seat belt that has an unbelted occupant (110) and switch-on the transistorized switches (04), that will then communicate through signals to the seat belt processor (140). The seat belt processor (140) will then switch on other transistorized switches to then enable the control module (25) to signal the cutoff switch (03), for possible shutoff if the occupant (110) is not belted. The presence of the occupant (110), will energize the load cell (15), that will then energize all the other switches (18). These switches (18) will check signals to make sure that all the occupants are belted. If any of the unbelted occupants is noticed, the counter (50), will signal the processor (140), and the processor (140) will then activate the control module (25). The control module (25) will then enable the cutoff switch (03). This cutoff switch (03), will be in a standby mode for about 5 minutes, which is adjustable, until the human voice response is broadcast, then said cutoff switch will shut off the engine if the occupant is still not belted. However, if the occupant decides to buckle up during the broadcasting sequence, the latching relay (80) will close-up the unbuckled signal for that seat and the control module (25), will receive said signal and switch back to normal mode. All signals are transmitted electronically in binaries, by means of the transistorize switches (04) turning different switching signals on and off in "0s" and "1s". Other elements of this invention also transmit their signals electronically. When the occupants (110) initially take the seats (10), all the loaded load cells signals will be in analog. The analog signals will then be converted to digital and compare to the preset signals to assure of the analog to digital signal transformation. The digital signals will correspond to the difference in the presence or absence of the occupant (110) on the seat (17), and the seat belt location. The said digital signal is then compared to the actual current level at each point on the seat pattern and the preset current level to confirm the presence and buckling of the occupants (110). When the seat belts (17) are latched, the little current that signal the computer system (00), will create magnetic field to enable permanent magnet at the contacts between the two metal connectors (46) of the seat belt (17), to allow the latches be locked when the vehicle is in motion. When the seat belts (17) are latched, a phototransistor (73) and light emitting diode "LED (74)" will face each other across an open slit (71) of the optoisolator circuit (70). The diode (74) will be energized when the occupant (110) is belted and the applied voltage will then provide a forward bias.

All signals for this smart seat belt control system are transmitted electronically by the commands from the computer motherboard (38), the processor (140), and the control module (25). When the occupants take the seats (10), all the load cells signals from that point will be in analog. The analog signals will then be compared to the preset signals by the encoder (37) to form digital signals. The digital signals will correspond to the difference in the presence or absence of the occupant (110) on the seat belt locations. These digital signals are also used to approximate the seat belt length and the seat belt tensioning force that is needed, and used to secure the occupants on the occupied seats during collision or vibration. If there is a great difference in length, the CPU (26), will send signals to the control module (25) that will then activate the voice chip (50), to warn of the attempts to tamper with the seat belts (17). If this behavior is still not corrected, then the control module (25), will activate the cutoff switch (03) to shut off the engine until the behavior is corrected. The digital signals are then compared to the actual current level at each point on the seat locations and the preset level to confirm the presence and buckling of the occupants (110). When collision is enabled, the CPU (26) will use information from the speed of the vehicle and the occupants weight information from the RAM (59), to calculate the appropriate tensional force. Said tensional force is safer to be applied on the seat belt (17), for tensioning and protecting the occupants (110) from injuries, without strangling said occupants on their seats (10). This tensional force is calculated from the occupant's weight, the speed of the vehicle, and the collision force. The speed is stored each time the vehicle's acceleration is changed. When the driver slows down on the speed, the EPROM (34) will replace that speed from the memory (32). The CPU (26) has all the necessary variables needed to compute the occupants protection level when the efficacy of the impact indent the prescribed threshold limit that is indicative of the described collision force. The CPU (26), upon receiving said collision force signal, will then assume a value and enable computation of the proper tensioning force needed to execute proper occupant safety. When the seat belts (17) are connected, a photo-transistor (73) and a light emitting diode (74) will face each other across an open slit (71) of the optoisolator circuit (70). The diode is energized when the applied voltage provides a forward bias. When an occupant is present and wearing the seat belt, the seat belt latching relay (80), will enable the interface module (200) to measure the light intensity as a signal indication that the occupant is present. A light intensity from the optoisolator switch (70) will send similar signals when the occupant is belted. The op-amp (35) will compare the light emitting diode "LED" for latching purposes when the load cell circuit is closed. The presence of any occupant energizes the load cell (15). The load cell in turn energizes all the other switches after the presence of the occupant is noticed. The counter (50) then checks to know the number of occupants that are in the vehicle and activates the latching relay (80). The latching relay (80) checks all the seat belt latches for the occupied seats and informs the processor (140). The counter (50) to make sure that the occupants (110) are belted, will then check all the switches (18). If any of the occupants (110) is not belted, the counter (50) will then inform the seat belt processor (140). The processor (140) will then signal the control module (25) that will then energize a human voice chip (020) for a warning response. At the end of the warning response, if the occupant (110) is still not belted, the control module (25) will activate the cutoff switch (03) and the engine will then shut off at the programmed time. The processor (140) will always check for belted occupants and assign a "0" signal to the control module (25) if the occupant (110) is unbelted. The seat belt processor (140) will then process other switching signals to ensure a timely seat belt buckling before the vehicle is engaged in motion. Each time the counter (50) picks signals from the load cells (15), all the other switches (18) will be energized. At the end of each count, the latching relay (80) output will close switch A, to enable the other switches to be processed. The optoisolator switch linkage to the control module (25) is energized when the ignition switch (01) is closed. Once the control module (25) is energized, the cutoff switch (03) will close, holding the control module (25) in the energized state. And when the occupant (110) is not wearing the seat belt, the counter circuit (50) and the latching relay circuit will close for that seat location. The cutoff switch (03) will then be opened for the engine to shut off at the programmed time after the warning signal is broadcast. Seat belt switches on seats 1, 2, 3, 4 use logic functions to close and open the counter (50) and the circuit for the latching relay (80). If the occupant (110) is present and wearing the seat belt (17), switch (88) will be closed for that seat location. If the occupant (110) is present but not wearing the seat belt (17), switch (88) will be opened for that seat location.

What is claimed is:

1. An apparatus for controlling the tension in a seat belt, such that in an accident, an occupant of a vehicle impacts the seat belt without injury; comprising:
   a pressure sensing device determining a weight value of the occupant;
   a computer system in signal communication with said pressure sensing device, said computer system calculating a coil value based upon the weight value of the occupant and
   a collision force according to a vehicle's speed; and
   a coil tensioner in communication with said computer system, rotating a moveable coil per coil value to maintain the seatbelt in sufficient tension to keep the occupant on a seat when a collision is sensed, but is not maintained in sufficient tension to cause impact injury to the occupant.

2. The apparatus of claim 1, further comprising an occupant sensing means for sounding an alarm if the occupant does not have the seatbelt locked, said means being in signal communication with said computer system.

3. The apparatus of claim 1, further comprising means for preventing unlocking of the seatbelt.

4. The apparatus of claim 3, wherein said means for preventing unlocking of the seatbelt is active when the vehicle is in motion.

5. The apparatus of claim 3, wherein said means for preventing unlocking of the seatbelt is overridden by a switch when the vehicle is not in motion.

6. The apparatus of claim 1, further comprising an occupant sensing means, in communication with said computer system for adjusting air bag deployment speed if the occupant does not have the seatbelt locked.

7. The seatbelt weight responsive occupant restraint system of claim 1, further comprising:
   a weight sensor for generating a signal responsive to an occupant's presence; and
   a microprocessor responsible for tracking behaviors of electromechanical devices in relation to the occupant restraint system when a collision is sensed.

8. The smart seatbelt apparatus of claim 1, wherein said apparatus enables the buckling of a plurality of seatbelt connectors, said seatbelt connectors being selectively latched when the vehicle is in motion, and selectively unlatched when the vehicle is not in motion.

9. The seatbelt weight responsive occupant restraint system of claim 1, wherein said restraint system includes an optoisolator switch with an LED connected to the output of a photocell for actuation of the seatbelt and enabling signal communication to a latching relay.

10. A supplemental restraint system comprising: a means for sensing weight and for generating a weight signal corresponding to the weight of an occupant on a seat; a central processing unit responsive to a digital signal which has been amplified and converted from said weight signal for generating a tensional restraining value; a coil responding to said tensional restraining value generating energy corresponding to said tensional restraining value; an optoisolator defining a monitoring means responding to a latching relay for releasing a controlled energy corresponding to said occupant's weight into said coil at a rate corresponding to said tensional restraining value; a coil rotating means generating a seatbelt tensional force proportionate to said occupant's weight and the speed of the vehicle and timely empowering said coil rotation at a rate corresponding to said occupant's weight and the collision force of the vehicle.

11. A smart seatbelt restraint system as claimed in claim 10, wherein said optoisolator defines a mechanism for transforming said generated weight signal into a controlled energy for variably controlling the tensional force of a seatbelt.

12. A smart seatbelt restraint system according to claim 11, wherein said controlled energy is responsible for enabling a coil rotation operation, to variably tension the seat belts.

13. A smart restraint system as claimed in claim 12 wherein said controlled energy from at least one sensor coordinates and controls a latching relay and an occupant seat counter enabling precise and accurate monitoring of the occupant's seatbelt latching activities.

14. A smart restraint system according to claim 13, including a photocell and an LED for measuring light intensity inside the optoisolator and comparing the buckling and unbuckling activities of the seatbelt.

15. A smart restraint control system according to claim 10, further comprising a device for processing an occupant's weight into a calculated tensional restraint value responsible for enabling a second device for generating a second energy, said second energy corresponding to the first energy generated by the load cell.

16. A smart restraint system according to claim 15, further comprising signal processing means for calculating said occupant's tensional restraint value, said signal processing means not excluding any microprocessors for processing digital and analog data for the control of seatbelt latching.

17. A smart restraint system according to claim 16, further comprising a device for enabling said second electrical energy to controllably bias an optoisolator spring, wherein said spring controls and monitors the contacts on each of the seat belt connectors.

18. A smart restraint system as claimed in 17, further comprising an amplifying device for amplifying a signal from a processing device when a collision is eminent.

19. A smart restraint system comprising: a seatbelt; means for sensing weight and generating a weight signal corresponding to the weight of an occupant on a seat; an encoder responsible for converting analog to digital signals which have been amplified and converted from said weight signal for generating a tensional force value; a coil responsive to said tensional force value; and means for controlling a tensional force exerted by said seatbelt empowered by said coil, so that said force exerted by said seatbelt is proportionate to said weight of said occupant between an upper and lower threshold.

20. A smart restraint system according to claim 19, further comprising a plurality of load cells, interposed between a plurality of seat mounting frames and the floor of the vehicle, generating a plurality of weight signals corresponding to the weight of one or more occupants on the seats.

21. A smart restraint system according to claim 20, further comprising a controller type thyristor electrically connected to the plurality of load cells, wherein said controller is responsive to said weight signal to selectively enable the seatbelt controlling means.

22. A smart restraint system as claimed in 21, further comprising an optoisolator including an LED and a photocell selectively engaging in signal communication with a latching relay, said latching relay responsive to latching activities for signaling thereof.

23. Means for controlling the seatbelt tensional restraint force on a vehicle occupant, said means comprising: at least one weight sensor for determining the weight of a seated occupant and generating a body weight signal indicative thereof; a load cell with at least one strain gauge for generating a signal when strained or under load, said signal responsive to signal communication of a plurality of devices, said at least one weight sensor including a device for transforming said body weight signal into electrical energy corresponding to the weight of said occupant and sampling input and output signals from said at least one sensor such that said weight of a seated occupant is measured and said seat belt tensional restraint force is controlled in response to said weight of a seated occupant.

24. Smart restraint control means, according to claim 23, further comprising a sensor with an incorporated software program for calculating said weight of a seated occupant to said tensional restraint force transformation.

25. Smart restraint control means, as claimed in claim 24, further comprising a sensing device responsive for transforming said weight of a seated occupant into electrical energy and enabling electromechanical devices to interface with a plurality of devices for controlling magnetic fields to enable a selected latching of the seatbelt.

26. Smart restraint control means of claim 23 further comprising means dependent on said seated occupant's presence for measuring the crash severity and responsively enabling a single or a plurality of seatbelt tensional restraint forces for protecting said seated occupant.

27. A smart restraint control system comprising: means for precisely monitoring the initial weight of a seated occupant and the weight of a changing occupant, for controlling the tensional restraint force of a seatbelt, comprising:

an address line, being a reference storage memory or medium for storing actual weight at initial sitting, said memory being different from either RAM or ROM;

an EPROM, for controlling data about a changing occupant at the address line;

a microprocessor means, for signal communicating with plurality of sensors, said sensors being in circuit communication with plurality of other signal processors and transistorized switches, enabling a seatbelt tensional restraint force.

28. A smart restraint system according to claim 27, including an impact collision sensor, for initiating restraint system, enabling tensioning of the occupant on the seat, with an enabling force indicative of the occupants weight, wherein said tensional force is dependent on said collision force and said speed of the vehicle.

29. A smart restraint control system according to claim 27, further comprising means for shutting-off the engine when a collision is sensed, said collision defines an accident but not limited to a roll over accident.

30. A smart restraint control system according to claim 29, further comprising means for shutting-off the engine when the vehicle is left unattended or the engine left idling.

31. A smart restraint control system as claimed in 27, wherein a switch is used for letting off occupants when the vehicle is stopped.

32. A smart restraint control system according to claim 27 further comprising bypass means for not allowing the vehicle to start when the driver is not on the driver's seat.

* * * * *